US007493406B2

(12) United States Patent
Amini et al.

(10) Patent No.: US 7,493,406 B2
(45) Date of Patent: Feb. 17, 2009

(54) MAXIMAL FLOW SCHEDULING FOR A STREAM PROCESSING SYSTEM

(75) Inventors: Lisa D. Amini, Yorktown Heights, NY (US); Anshul Sehgal, New York, NY (US); Jeremy I. Silber, New York, NY (US); Olivier Verscheure, Hopewell Junction, NY (US); Joel L. Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 11/451,775

(22) Filed: Jun. 13, 2006

(65) Prior Publication Data

US 2007/0299980 A1    Dec. 27, 2007

(51) Int. Cl.
*G06F 15/16* (2006.01)
*G06F 15/173* (2006.01)
(52) U.S. Cl. ...................................... 709/231; 709/240
(58) Field of Classification Search ................. 709/231, 709/240
See application file for complete search history.

(56) References Cited

U.S. PATENT DOCUMENTS

| 6,999,419 B2* | 2/2006 | Ise et al. ...................... 370/230 |
| 7,159,219 B2* | 1/2007 | Chen et al. ................... 718/103 |
| 7,359,971 B2* | 4/2008 | Jorgensen .................... 709/226 |

OTHER PUBLICATIONS

Microsoft DirectX version 9.0 software development toolkit. Http://msdn.microsoft.com/directx/directxSDK/default.aspx.

Arasu, A. et al., "Stream: The Stanford Stream Data Manager (demonstration description)", Proceedings of the 2003 ACM International Conference on Management of Data (SIGMOD 2003), San Diego, CA., Jun. 2003.

Azar, Y. et al., "Management of Multi-Queue Switches in QoS Networks," 2003.

Balazinska, M. et al., "Load Management and High Availability in the Medusa Distributed Stream Processing System," In SIGMOD '04: Proceedings of the 2004 ACM SIGMOD International Conference on Management of Data, pp. 929-930, New York, NY USA 2004, ACM Press.

(Continued)

*Primary Examiner*—William C Vaughn, Jr.
*Assistant Examiner*—Kristie D. Shingles
(74) *Attorney, Agent, or Firm*—Alison D. Mortinger; Jon A. Gibbons; Fleit Gibbons Gutman Bongini & Bianco P.L.

(57) ABSTRACT

Disclosed is a method, upstream processing node, and computer readable medium for processing data packets. The method includes receiving an allocation for at least one computing resource. At least one data packet at one or more upstream processing elements in an upstream processing node is received. The method also includes determining if at least one output queue of the upstream processing elements includes available space for processing of the data packet. The data packet is processed in response to the output queue including available space to form a resulting data packet. The method further includes determining that an input queue of at least one downstream processing element of a plurality of downstream processing elements includes available space for receiving the resulting data packet In response to the determining, the resulting data packet is transmitted from the upstream processing element to the downstream processing element.

1 Claim, 12 Drawing Sheets

OTHER PUBLICATIONS

Baptiste, P. et al., "Preemptive Scheduling of Equal-Length Jobs to Maximize Weighted Throughput," Mar. 5, 2003.

Bartal, Y. et al., "Online Competitive Algorithms for Maximizing Weighted Throughput of Unit Jobs," 2004.

Buck, J.T. et al., "Ptolemy: A Framework for Simulating and Prototyping Heterogeneous Systems," Int. Journal of Computer Simulation, special issue on "Simulation Software Development," vol. 4, pp. 155-182, Apr. 1994.

Chandra, A. et al., Surplus Fair Scheduling: A Proportional-Share CPU Scheduling Algorithm for Symmetric Multiprocessors, pp. 45-58.

Chandrasekaran, S. et al., "TelegraphCQ: Continuous Dataflow Processing for an Uncertain World," In Proceedings of the 2003 Conference on Innovative Data Systems Research (CIDR 2003), Asilomar, CA 2003.

de Niz, D., et al., "Resource Sharing in Reservation-Based Systems," In RTSS '01: Proceedings of the $22^{nd}$ IEEE Real-Time Systems Symposium (RTSS'01), p. 171, Washington, D.C., USA 2001, IEEE Computer Society.

Hoang, P., et al., "Scheduling of DSP Programs onto Multiprocessors for Maximum Throughput," IEEE Transactions on Signal Processing, 41(6):2225-2235, Jun. 1993.

Hollot, C.V., et al., "On Designing Improved Controllers for AQM Routers Supporting TCP Flows," In INFOCOM, pp. 1726-1734, 2001.

Humphreys, G., et al., "Chromium: A Stream-Processing Framework for Interactive Rendering on Clusters," 2002.

Koster, R., et al., "Infopipes for Composing Distributed Information Flows," In Proceedings of the 2001 ACM Multimedia Workshop on Multimedia Middleware, Ottawa, Canada, Oct. 2001.

Lam, T., et al., "On the Speed Requirement for Optimal Deadline Scheduling in Overloaded Systems," In Proc. $15^{th}$ International Parallel and Distributed Processing Symposium, p. 202, 2001.

Lee, E.A., et al., "Static Scheduling of Synchronous Data Flow Programs for Digital Signal Processing," IEEE Transactions on Computing, 36(1):24-35, Jan. 1987.

Nagar, S., et al., "Improving Linux Resource Control Using CKRM," In Proceedings of the 2004 Ottawa Linux Symposium, Ottawa, Canada, Jul. 2004.

Park, I., et al., "Stable Load Control with Load Prediction in Multipath Packet Forwarding," In ICOIN, pp. 437-444, 2001.

Pietzuch, P., et al., "Network-Aware Operator Placement for Stream-Processing Systems," To Appear: Proceedings of the $22^{nd}$ International Conference on Data Engineering (ICDE '06), Atlanta, GA, Apr. 2006, Saewong, S., et al., "Cooperative scheduling of Multiple Resources," In RTSS '99: Proceedings of the $20^{th}$ IEEE Real-Time Systems Symposium, p. 90, Washington, D.C., USA, 1999, IEEE Computer Society.

Schwetman, H., "CSIM: A C-Based Process-Oriented Simulation Language," In WSC '86: Proceedings of the $18^{th}$ Conference on Winter Simulation pp. 387-396, New York, NY USA 1986, ACM Press.

Zdonik, S., "The Aurora and Medusa Projects;" Bulletin of the IEEE Technical Committee on Data Engineering, Mar. 2003.

* cited by examiner

MAXIMAL FLOW SCHEDULING FOR A STREAM PROCESSING SYSTEM

STATEMENT REGARDING FEDERALLY SPONSORED RESEARCH OR DEVELOPMENT

This invention was made with Government support under Contract No.: TIAH98230-04-3-0001 awarded by the U.S. Department of Defense. The Government has certain rights in this invention.

CROSS REFERENCE TO RELATED APPLICATION

This application is related to the inventors' application "DYNAMIC STABILIZATION FOR A STREAM PROCESSING SYSTEM" Ser. No. 11/451,947, now Publication No. US 2008/0005392, which was filed on the same day as the present application and commonly assigned herewith to International Business Machines Corporation. This related application is incorporated herein by reference in its entirety.

FIELD OF THE INVENTION

The present invention generally relates to the field of distributed stream processing systems, and more particularly relates to scheduling techniques for a distributed stream processing system.

BACKGROUND OF THE INVENTION

The stream processing paradigm has always played a key role in time-critical systems. Traditional examples include digital signal processing systems, large-scale simulation platforms, multimedia clients and servers, and high resolution rendering farms as described in *Microsoft DirectX version 9.0 software development toolkit*. http://msdn.microsoft.com/directx/directxSDK/default.aspx; Aravind Arasu, Brian Babcock, Mayur Datar, Keith Ito, Itaru Nishizawa, Justin Rosenstein, and Jennifer Widom. *STREAM: The Stanford stream data manager (demonstration description). In Proceedings of the* 2003 *ACM International Conference on Management Data (SIGMOD* 2003), San Diego, Calif., June 2003; J. T. Buck, S. Ha, E A. Lee, and D. G. Messerschmitt. Ptolemy: *a platform for heterogeneous simulation and prototyping. In Proceedings of the* 1991 *European Simulation Conference,* Copenhagen, Denmark, June 1991; Sirish Chandrasekaran, Owen Cooper, Amol Deshpande, Michael J. Franklin, Joseph M. Hellerstein, Wei Hong, Sailesh Krishnamurthy, Sam Madden, Vijayshankar Raman, Fred Reiss, and Mehul Shah. *TelegraphCQ: Continuous dataflow processing for an uncertain world. In Proceedings of the* 2003 *Conference on Innovative Data Systems Research (CIDR* 2003), Asilomar, Calif., 2003; P. D. Hoang and J. M. Rabaey. *Scheduling of DSP programs onto multiprocessors for maximum throughput. IEEE Transactions on Signal Processing,* 41(6):2225-2235, June 1993; Greg Humphreys, Mike Houston, Ren Ng, Randall Frank, Sean Ahern, Peter D. Kirchner, and James T. Klosowski. *Chromium: A steam-processing framework for interactive rendering on clusters.* 2002; Rainer Koster, Andrew Black, Jie Huang, Jonathan Walpole, and Calton Pu. Infopipes for composing distributed information flows. In *Proceedings of the* 2001 *ACM Multimedia Workshop on Multimedia Middleware,* Ottawa, Canada, October 2001; Stan Zdonik, Michael Stonebraker, Mitch Cherniak, Ugur Cetintemel, Magdalena Balazinska, and Hari Balakrishnan. *The Aurora and Medusa projects. Bulletin of the IEEE Technical Committee on Data Engineering,* March 2003, which are hereby incorporated by reference in their entirety. More recently, distributed stream processing systems are being developed for high performance transaction processing, continuous queries over sensor data and enterprise-wide complex event processing.

In today's distributed stream data processing systems, massive numbers of real-time streams enter the system through a subset of processing nodes. Processing nodes may be co-located, for example within a single cluster, or geographically distributed over wide areas. Applications are deployed on processing nodes as a network of operators, or processing elements, as depicted in FIG. 1. Each data stream is comprised of a sequence of Stream Data Objects (SDOs), the fundamental information unit of the data stream. Each processing element performs some computation on the SDOs received from its input data stream, e.g., filter, aggregate, correlate, classify, or transform.

The output of this computation could alter the state of the processing element, and/or produce an output SDO with the summarization of the relevant information derived from (possibly multiple) input SDOs and the current state of the processing element. In order to carry out the computation, the processing element uses computational resources of the processing node on which it resides. The available computational resources on a node are finite, and are divided among the (possibly multiple) processing elements residing on the node either through time-sharing of the processor, or a parallel processing mechanism.

In a distributed stream processing system, both network and processor resources are constrained. Thus, efficient use of resources, low delay, and stable system operation are the critical resource management challenges. While these goals are typical for resource schedulers, properties of the distributed stream processing system complicate matters. For example, each processing element's resource utilization is constrained by processing elements that are upstream and downstream of the processing element in the processing graph. Further, a processing element's resource consumption may be state dependent, resulting in bursty processor and network utilization throughout the system. Even developing an appropriate measure of effectiveness is difficult because the units of work (input packets) and operations (processing element computations) are unequally weighted, and therefore monitoring resource utilization alone is insufficient.

Stream processing jobs are relatively long running and as new work is introduced into the system, the relative weights or priorities of the various jobs may change. The task of assigning weights or priorities to jobs may be performed by a human, or it may be performed by a "meta scheduler". The goal of meta schedulers generally is to assign time-averaged allocation targets based on relative importance of work submitted to a system. In comparison, the goal of a resource scheduler is to enforce these long-term allocation targets. In traditional shared processor environments, resource schedulers are responsible for selecting a waiting process from the ready queue (queue of processes waiting) and allocating the resource (CPU) to it. Priority-based or proportional share schedulers allow a system administrator to configure the system such that when a job is submitted, a weight or priority may be assigned. This weight or priority information may then be used by the scheduler in the decision process for selecting a waiting process from the ready queue.

Current scheduling/meta-scheduling technology does not adequately address stream processing environments. Examples of scheduling/meta-scheduling technology are describe in U.S. Pat. No. 4,814,978 entitled "Dataflow processing element, multiprocessor, and processes"; U.S. Pat. No. 5,241,677 entitled "Multiprocessor system and a method of load balancing thereof"; U.S. Pat. No. 5,742,821 entitled "Multiprocessor scheduling and execution"; U.S. Pat. No. 6,167,029 entitled "System and method for integrated data flow control; U.S. Pat. No. 6,415,410 entitled "Sliding-window data flow control using an adjustable window size"; U.S. Pat. No. 6,426,944 entitled "Method and apparatus for controlling data messages across a fast packet network"; U.S. Pat. No. 6,694,345 entitled "External job scheduling within a distributed processing system having a local job control system"; U.S. Pat. No. 6,795,870 entitled "Method and system for network processor scheduler"; and U.S. Pat. No. 6,795,442 entitled "System and method for scheduling message transmission and processing in a digital network", which are hereby incorporated by reference in their entirety. In this environment, the entities to be scheduled (processing elements) are interconnected such that the input (e.g., data packets) of one processing element is some or all of the output of one or more processing elements. The issue arises when either the rate of data packets arriving at a processing element is bursty or the resources required to process a data packet is bursty.

Today's resource schedulers typically take one of three approaches: strict enforcement, guarantee-limit enforcement and velocity enforcement. One problem with strict enforcement is that if the resource scheduler attempts to strictly enforce the long-term allocation target provided by the meta-scheduler, the input buffer of the processing element may overflow when a burst of data arrives. Additionally, consider the case when two processing elements (PE A and PE B) are executing in a single processing node. During some time intervals, the input rate of PE A may temporarily require less than its long-term allocation, while the input rate of PE B may temporarily require more than its long-term allocation. If the resource scheduler strictly adheres to the allocation of the meta-scheduler, the buffers of PE B overflow, even though resources are not fully utilized. Strict, enforcement is further described in Saowanee Saewong and Ragunathan (Raj) Rajkumar. *Cooperative scheduling of multiple resources. In RTSS '99: Proceedings of the 20th IEEE Real-Time Systems Symposium*, page 90, Washington, D.C., USA, 1999. IEEE Computer Society, which is hereby incorporated by reference in its entirety.

Under guarantee-limit enforcement, the inputs to the resource scheduler are a minimum guaranteed allocation and a limit on the maximum allocation for each job. This solution would enable PE B (from previous example) to utilize additional resources during periods of low activity for PE A. However, since the scheduler does not take the processing element's instantaneous buffer occupancy and input data rate into account, it does not increase the processing element's short-term processing allocation in the event of a burst of input data, thereby increasing the likelihood of a buffer overflow at the processing element. Guarantee-limit enforcement is further described in Shailabh Nagar, Rik van Riel, Hubertus Franke, Chandra Seetharaman, Vivek Kashyap, and Haoqiang Zheng. *Improving Linux resource control using CKRM. In Proceedings of the* 2004 *Ottawa Linux Symposium*, Ottowa, Canada, July 2004; Dionisio de Niz, Luca Abeni, Saowanee Saewong, and Ragunathan (Raj) Rajkumar. *Resource sharing in reservation-based systems. In RTSS '01: Proceedings of the* 22*nd IEEE Real-Time Systems Symposium* (*RTSS "*01), page 171, Washington, D.C., USA, 2001. Computer Society; Abhishek Chandra, Micah Adler, Pawan Goyal, and Prashant Shenoy. *Surplus fair scheduling: A Proportional-Share CPU scheduling algorithm for symmetric multiprocessors*. Pages 45-58, which is hereby incorporated by reference in its entirety.

Under velocity enforcement each processing element is assigned a weight, the higher the weight, the less the processing element should have to wait for a resource when being selected from the ready queue. Thus, the resource scheduler bases its selection from the ready queue on the weight (velocity) assigned the processing element, and the amount of time the processing element has had to wait for resources in the current epoch. Consider the scenario where the input data rate into a PE is bursty. At a given instant of time the input buffer of the PE is empty, i.e., the PE is idle. Subsequently, the PE receives a burst of data. A velocity based scheduler would process one SDO in the PE's input buffer and then wait until the PE's wait time exceeds the velocity value of the PE before processing the subsequent SDOs. Owing to the burst, it is possible for the processing element's input buffer to overflow with data while it is in the wait-state. Velocity enforcement is further described in P. Bari, C. Covill, K. Majewski, C. Perzel, M. Radford, K. Satoh, D. Tonelli, and L. Winkelbauer. *IBM enterprise workload manager*, which is hereby incorporated by reference in its entirety.

Thus, traditional scheduling approaches are not directly applicable to stream processing systems. This is primarily because the requirements of such systems go beyond traditional processor sharing, e.g. stream processing systems challenge the practice of statically assigning of priorities to processing elements. Furthermore, resource management specifically for distributed stream processing systems has focused on effective placement of processing elements and load management. In dynamic placement techniques, the operator (PE) placement can be modified during execution to adapt to changes in resource availability, based on maximizing some objective function on a time-averaged basis. Dynamic placement is further described in Peter Pietzuch, Jonathan Ledlie, Jeffrey Shneidman, Mema Roussopoulos, Matt Welsh, and Margo Seltzer. In *Proceedings of the 22nd International Conference on Data Engineering (ICDE'06)*, April 2006. Load shedding was proposed as a means to intelligently drop tuples (SDOs) from input queues, based on thresholds and potentially packet content. Load shedding is further described in Magdalena Balazinska, Hari Balakrishnan, and Michael Stonebraker. *Load management and high availability in the medusa distributed stream processing system. In SIGMOD '04: Proceedings of the* 2004 *ACM SIGMOD international conference on Management of data*, pages 929-930, New York, N.Y., USA, 2004. ACM Press, which are hereby incorporated by reference in their entirety.

Both dynamic placement and load shedding work target environments where the system must adjust to available underlying resource allocations (either by moving operators or shedding load). However, these techniques ultimately require over-provisioning to deal with the unpredictable nature of stream processing.

Therefore a need exists to overcome the problems with the prior art as discussed above.

SUMMARY OF THE INVENTION

Briefly, in accordance with the present invention, disclosed is a method, upstream processing node, and computer readable medium for processing data packets. The method includes receiving an allocation for at least one computing resource. At least one data packet at one or more upstream processing elements in an upstream processing node is received. The method also includes determining if at least one output queue of the upstream processing elements includes available space for processing of the data packet. The data packet is processed in response to the output queue including available space to form a resulting data packet. The method further includes determining that an input queue of at least one downstream processing element of a plurality of downstream processing elements includes available space for receiving the resulting data packet In response to the determining, the resulting data packet is transmitted from the upstream processing element to the downstream processing element.

In another embodiment, an upstream processing node for processing data streams is disclosed. The upstream processing node includes a memory and at least one upstream processing element that is communicatively coupled to the memory. The processing element receives at least one data packet and forms a processed data packet therefrom.

The upstream processing node also includes a scheduler. The scheduler includes a meta-scheduler that is communicatively coupled to the memory and the upstream processing element. The meta scheduler allocates computing resources to the upstream processing element. The scheduler also includes a CPU scheduler that is communicatively coupled to the meta-scheduler and the upstream processing element. The CPU scheduler determines if an output queue of the upstream processing element includes available space for processing of the data packet and if an input queue of at least one downstream processing element of a plurality of downstream processing elements includes available space for receiving the processed data packet. The upstream processing nodes also include an output queue that is communicatively coupled to the upstream processing element for transmitting the processed data packet from the upstream processing element to the downstream processing element.

In yet another embodiment, a computer readable medium for processing data packets is disclosed. The computer readable medium comprises instructions for receiving an allocation for at least one computing resource. At least one data packet at one or more upstream processing elements in an upstream processing node is received. The method also includes determining if at least one output queue of the upstream processing elements includes available space for processing of the data packet. The data packet is processed in response to the output queue including available space to form a resulting data packet. The method further includes determining that an input queue of at least one downstream processing element of a plurality of downstream processing elements includes available space for receiving the resulting data packet In response to the determining, the resulting data packet is transmitted from the upstream processing element to the downstream processing element.

One advantage of the present invention that the resource (processor and network) allocations are determined and controlled (placement and fractional allocations) in order to maximize an objective function and maintain overall stability. Further, instead of artificially limiting configuration changes (e.g., operator placement) since such changes destabilize the system, the present invention uses a control theoretic approach so the system can be self-stabilizing in the face of changes. This is especially important since changes may be induced by the scheduler or the bursty nature of the workload itself.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Exemplary Distributed Stream Processing System

Figure 1:
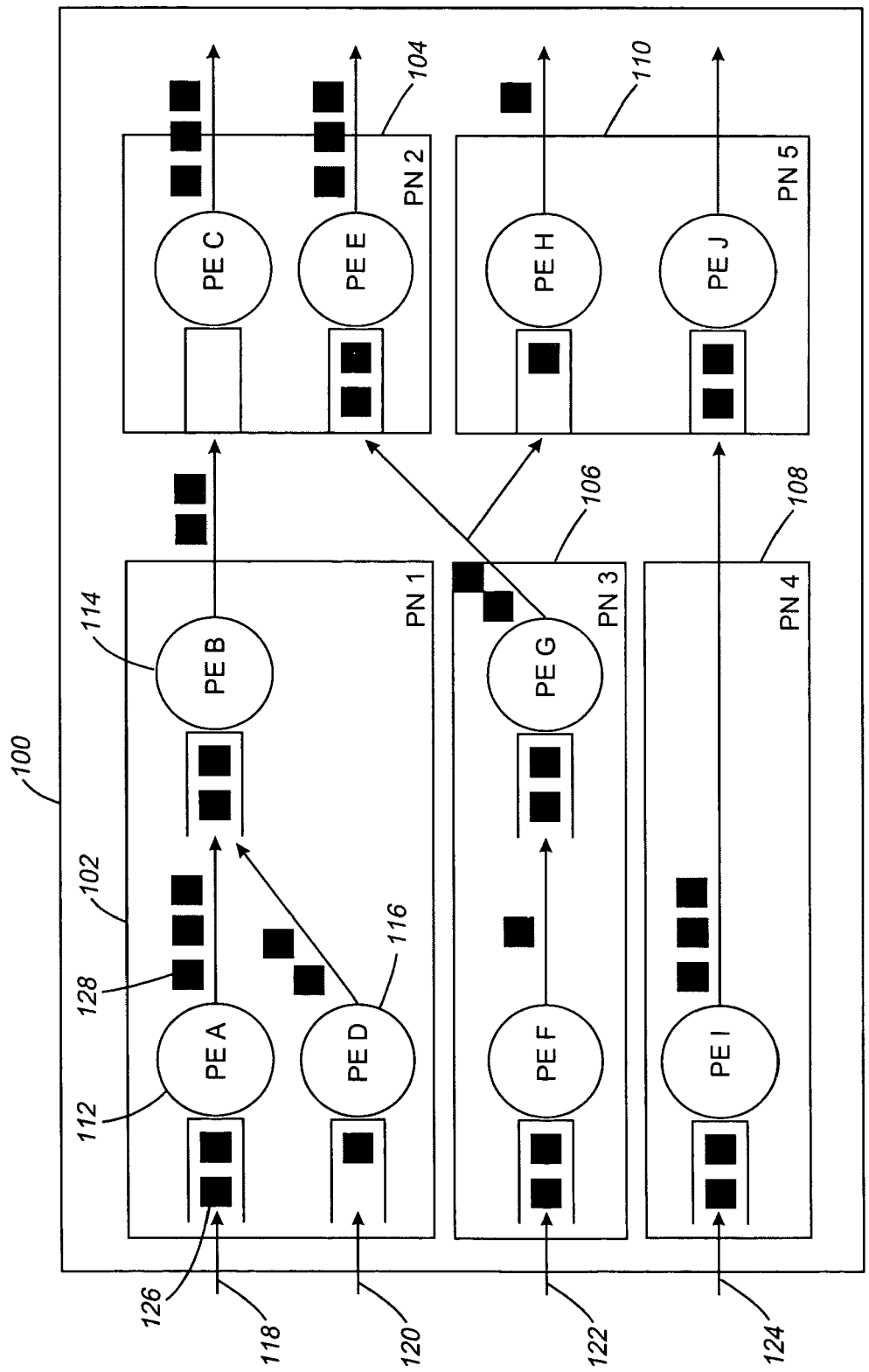
FIG. 1 is a block diagram illustrating a traditional distributed stream processing system.
Figure 2:
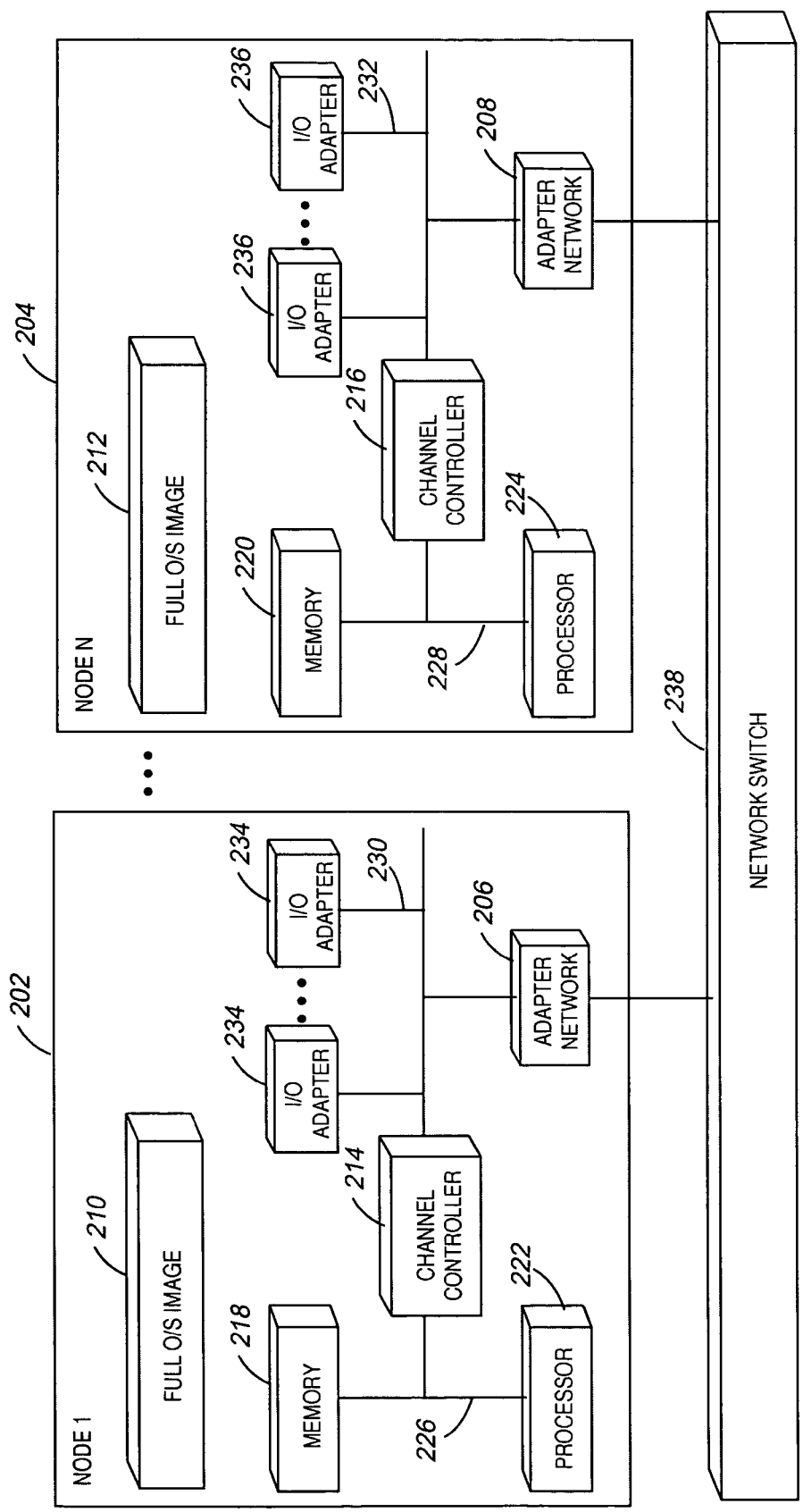
FIG. 2 is a more detailed view of the processing nodes of FIG. 2, according to the present invention.

According to an embodiment of the present invention, as shown in FIG. 2, an exemplary distributed stream processing system 200 is shown. In one embodiment, the distributed stream processing system 200 can operate in an SMP computing environment. The distributed stream processing system 200 executes on a plurality of processing nodes 202, 204 coupled to one another node via a plurality of network adapters 206, 208. Each processing node 202, 204 is an independent computer with its own operating system image 210, 212, channel controller 214, 216, memory 218, 220, and processor (s) 222, 224 on a system memory bus 226, 228, a system input/output bus 230, 232 couples I/O adapters 234, 236 and network adapter 206, 208. Although only one processor 222, 224 is shown in each processing node 202, 204, each processing node 202, 204 is capable of having more than one processor. Each network adapter is linked together via a network switch 238. In some embodiments, the various processing nodes 102, 104 are able to be part of a processing cluster. All of these variations are considered a part of the claimed invention.

Exemplary Processing Nodes

Figure 3:
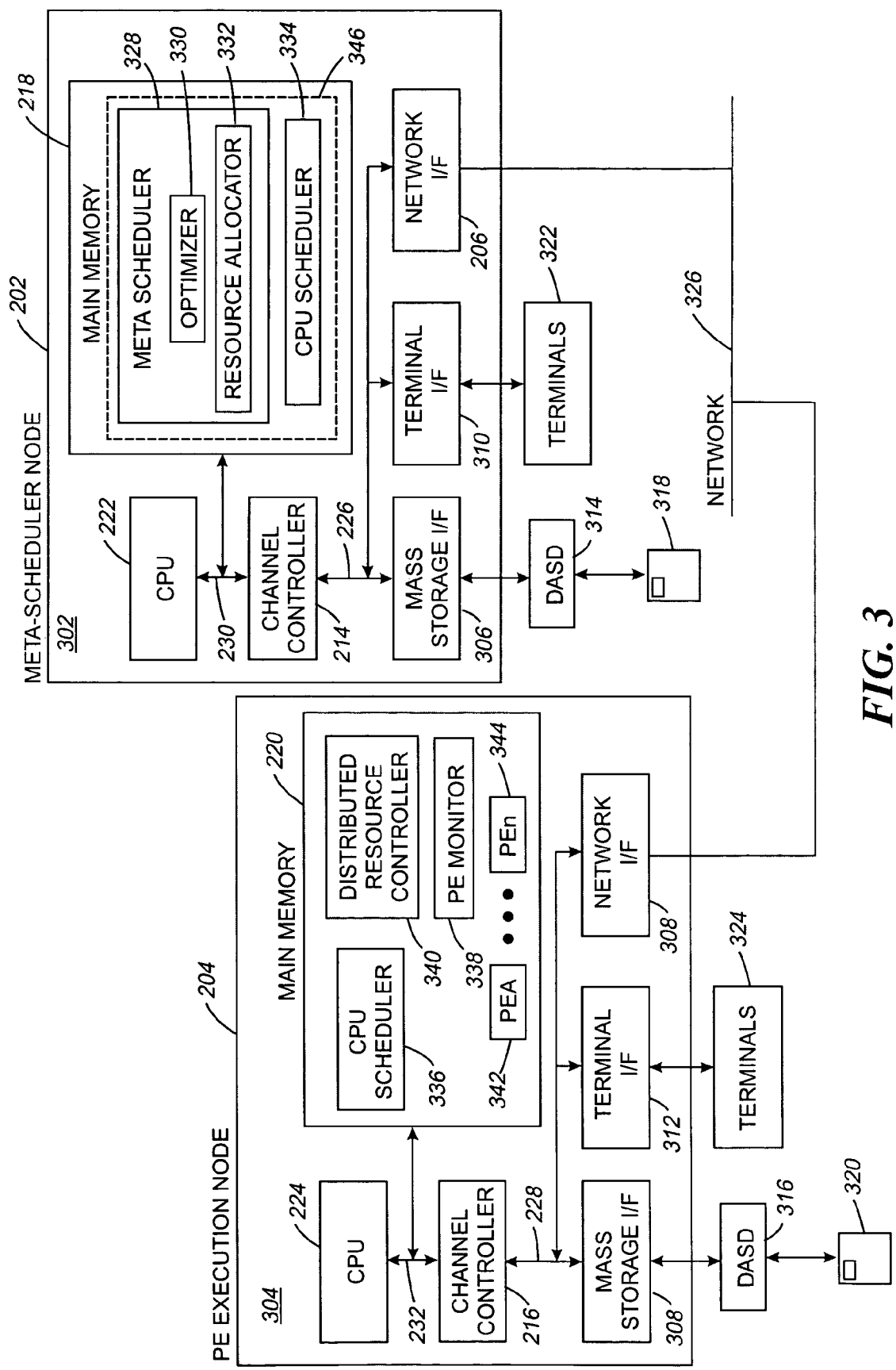
FIG. 3 is a block diagram illustrating a more simplified version of a processor as shown in FIG. 1, according to the present invention.

FIG. 3 is a block diagram illustrating a more detailed view of the processing nodes 202, 204 of the distributed computing environment 200 of FIG. 2. FIG. 3 illustrates one of the processing nodes 202 as a meta-scheduler node and another processing node 204 as a processing element execution node ("PE execution node"). It should be noted that the present invention is not limited to these specific configurations of the processing elements 202, 204. Each processing node 202, 204 is based upon a suitably configured processing system adapted to implement the exemplary embodiment of the present invention. Any suitably configured processing system is similarly able to be used as the processing nodes 202, 204 by embodiments of the present invention, for example, a personal computer, workstation, or the like. Each processing node 202, 204 includes a computer 302, 304. The computer 302, 304 has a processor 222, 224 that is connected to the main memory 218, 220 and a channel controller 214, 216 via the system bus 230, 232. The computer 302, 304 also includes a mass storage interface 306, 308, terminal interface 310, 312, and network adapter hardware 206, 208. An input/output bus 226, 228 connects these components. The mass storage interface 306, 308 is used to connect mass storage devices such as data storage device 314, 316 to the processing nodes 202, 204. One specific type of data storage device is a computer readable medium such as a floppy disk drive, which may be used to store data to and read data from a floppy diskette 318, 320 or CD (not shown). Another type of data storage device is a data storage device configured to support, for example, NTFS type file system operations.

The main memory 218 of the meta-scheduler node 202 includes a scheduling system 346. The scheduling system 346 comprises a meta-scheduler 328, CPU scheduler 334, an optimizer 330, and a resource allocator 332. The meta-scheduler 328 assigns a fractional allocation of the PE execution node 204 resources to various processing elements 342, 344 that reside, in one embodiment, in the PE execution node 204. A meta-scheduler node may control resources of one or more PE execution nodes 204. The meta-scheduler 328, in one embodiment, analyzes the information gained at each processing element 342, 344 residing within the PE execution node 204. A processing element, in one embodiment, is an application that performs a particular computation on data such as processing elements PE A 342 and PE N 344. Information is gained after a processing element processes a data packet (SDO). The meta-scheduler 328 can assign a weight to the particular processing element 342, 344 based upon the time-averaged resource requirements for fully processing its inputs and, in one embodiment, a metric reflecting the relative priority of the task (i.e., the expected information gain) meta-scheduler 328 processing element 342, 344.

The meta-scheduler 328 contains an optimizer component 330 and a resource allocator component 332. The optimizer 330 uses the weights assigned to the processing elements 342, 344 to optimize CPU allocation among the weighted processing elements 342, 344. Some processing elements may not be allocated CPU resources if the current load and weights are such that it is better to allocate all resources to other processing elements. This optimization attempts to maximize the weighted information gain across all the PE execution nodes 204. Once an optimization has been determined, a resource allocator component 332 in the meta-scheduler node 202 assigns resource allocations to particular targets in the processing element execution node 204 following the optimization scheme determined by the optimizer 330. In one embodiment, the CPU allocations are determined by an optimization of weight-adjusted objective function, which is described in greater detail below. The objective function, in one embodiment, preferentially assigns CPU resources to processing elements that individually or collectively produce the highest weighted information gain. The global optimization method is described in greater detail below.

Figure 12:
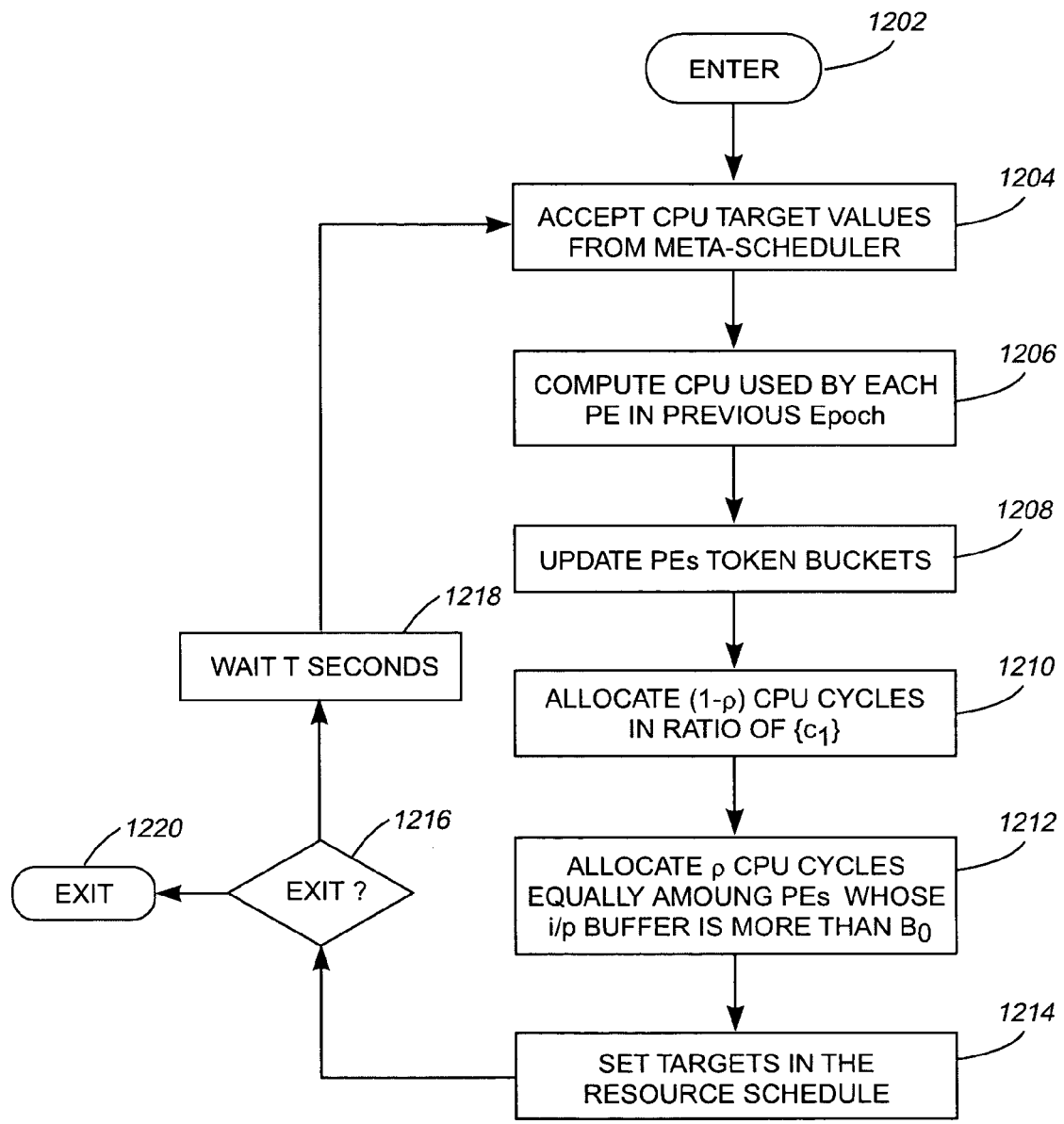
FIG. 12 is an operational flow diagram illustrating an exemplary process for CPU control, according to an embodiment of the present invention.

The meta-scheduler 328 then communicates the resource allocation targets to the distributed resource controller 340 on the appropriate PE execution node 204. The distributed resource controller ("DRC") 340 accepts this information as the time-averaged target CPU allocation for the associated PEs 342, 344. The DRC 340 is responsible, in one embodiment, for determining the actual CPU allocation at any given time and communicating the CPU allocation to the CPU scheduler 336 of the processing element execution node 204. This process of DRC 340 is illustrated in FIG. 12. The CPU scheduler 334, 336 is instantiated on each processing node 202, 204. The CPU scheduler 334, 336 enforces the allocations made by the meta-scheduler 328 and DRC 340 for the local node.

The PE execution node 204 includes a processing element monitor 338, which in one embodiment, resides in the main memory 220. The processing element monitor 338 monitors the processing rate, input rate, and quantity of buffered data for each processing element in the PE execution node 204 For example, the processing element monitor 338 monitors the input and output queues of the processing elements 342, 344. In another embodiment, this monitoring can occur within the DRC 340. If the processing monitor 338 determines that a particular processing element 342, 344 requires a different input rate, this new rate is communicated to the DRC 340. If a processing element 342, 344 is sending data to a different processing element 342, 344, that processing element is said to be downstream. The processing element monitor 338 of a downstream processing element proactively informs the processing element monitor of the directly upstream processing elements about the desired input rate.

Processing Graph

Figure 4:
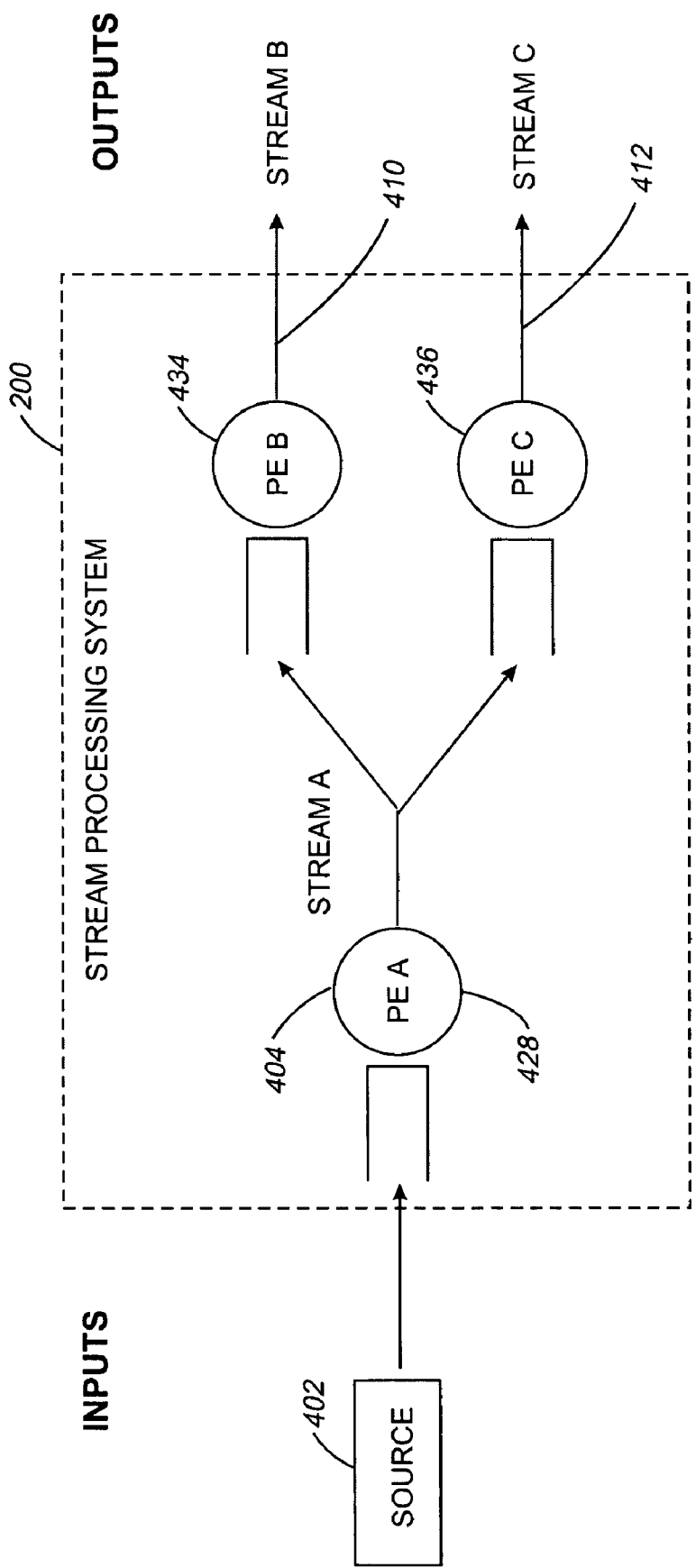
FIG. 4 is an exemplary stream processing graph, according to the present invention.

FIG. 4 shows a basic processing graph including processing elements PE A 428, PE B 434, and PE C 436 according to an embodiment of the present invention. A "stream" is defined as a named channel upon which data packets (or, equivalently stream data objects ("SDOs") are transported. The term "source node" can be used identify nodes where data packets arrive from outside the system 200. The term "sink node" can be used to identify nodes where information gain occurs. Processing elements that both forward packets and achieve information gain can be modeled as two nodes (one for forwarding and the second for information gain).

Processing elements (processing elements) are the basic processing units of a stream processing model. Each processing element takes zero or more streams as input and has zero or more streams as output. The processing element may do arbitrary processing and/or transformation of the SDOs that arrive on the input streams and output arbitrary SDOs to its output streams. Many processing elements, however, exhibit strong correlations between input and output streams. For example, a common type of processing element is an "annotator" which takes an input SDO, performs some kind of analysis on it, appends to the SDO an annotation summarizing the analysis, and outputs the annotated SDO. A processing node 202, 204 is a logical container with a specific pool of resources which may be used to send and receive streams and execute processing elements. In practical terms, a processing node 202, 204 is a network host on which processing elements reside. The resources used to run these processing elements include network bandwidth for handling streams or CPU and memory allocated to executing the processing element. In one embodiment, a processing element is modeled using a stat-machine and is characterized through its input-output relationship.

In FIG. 4, processing element PE A 428 receives SDOs from a source 402. Processing element PE A 428 processes the received SDO(s) and outputs either one or more SDOs to a stream A 404. The processing elements PE B 434 and PE B 436 subscribe to stream A 404. The processing element PE 2B 406 receives SDOs outputted by the processing element PE A 428. The processing element PE B 434 processes these SDOs and then outputs either one or more SDOs to stream B 410. The processing element PE B 436 also receives the SDOs outputted by the processing element PE A 428. The processing element PE B 436 processes these SDOs and outputs one or more SDOs to stream C 412. The outputs of the system are streams B 410 and C 412. Stream A 404 is necessary as an intermediate stream, that is, stream A 404 does not directly contribute to any measure of productivity for the overall system.

Although illustrated as concurrently resident in the main memory 218, 220 it is clear that respective components of the main memory 218 are not required to be completely resident in the main memory 218, 220 at all times or even at the same time. In one embodiment, the each processing node 202, 204 utilizes conventional virtual addressing mechanisms to allow programs to behave as if they have access to a large, single storage entity, referred to herein as a computer system memory, instead of access to multiple, smaller storage entities such as the main memory 218, 220 and data storage device 308. Note that the term "computer system memory" is used herein to generically refer to the entire virtual memory of the processing node 202, 204.

Although only one CPU 222, 224 is illustrated for computer 302, 304 computer systems with multiple CPUs can be used equally effectively. Embodiments of the present invention further incorporate interfaces that each includes separate, fully programmed microprocessors that are used to off-load processing from the CPU 222, 224. Terminal interface 310, 312 is used to directly connect one or more terminals 322, 324 to computer 302, 304 to provide a user interface to the computer 302, 304. These terminals 312, which are able to be non-intelligent or fully programmable workstations, are used to allow system administrators and users to communicate with the processing node 202, 204. The terminal 322, 324 is also able to consist of user interface and peripheral devices that are connected to computer 302, 304 and controlled by terminal interface hardware included in the terminal I/F 306 that includes video adapters and interfaces for keyboards, pointing devices, and the like.

An operating system 210, 212 (FIG. 3) included in the main memory, 218, 220 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 202, 204. The network adapter hardware 206, 208 is used to provide an interface to the network 326. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 318, 320, CD ROM, or other form of recordable media, or via any type of electronic transmission mechanism.

One advantage of the present invention is that a two-tiered approach for adaptive, distributed resource control is provided. For example, when a new processing element 342, 344 is deployed, this first tier performed by the meta-scheduler 328 selects a processing node 202, 204 and the fractional allocations of processing node resources for each processing element. Allocations are determined through a global optimization of the weighted throughput for the processing graph, based on an expected, time-averaged input stream rates. First tier decisions are made when a PE is instantiated or terminated and periodically to allow incremental deployment of PEs and to adjust for changes in resources or workload; second tier decisions are made in a distributed, ongoing manner. This second tier process, which is performed by the DRC 340, jointly optimizes the input and output rates of the processing element and the instantaneous processing rate of a processing element 342, 344. Therefore, a distributed stream processing system can be stabilized when events such as data packet bursts occur.

Another advantage of the present invention is that unlike conventional resources, the scheduling system 346 of the present invention, which includes the meta-scheduler 328, optimizer 330, and resource allocator 330, takes the input data flow rate and the a priori importance of the input data stream into account when allocating resources to a processing element. The scheduling system 346 of the present invention is also scalable because the DRC 340 and CPU scheduler 338 use only locally derived information to enforce the allocations made by the meta-scheduler 328. The scheduling system 346 provided by the present invention strikes a compromise between optimality and stability by first solving for the global solution that does not take the stochastic, time-varying nature of the data flows into account to determine nominal CPU allocations among the processing elements 342, 344. During run-time, these nominal allocations are altered to ensure stability based on the local information available to each processing element.

Another advantage of the present invention is the metric used for measuring system performance. Conventional processor sharing algorithms typically use metrics based on resource utilization, e.g. the more work that is done, the better, as is further described in *Tak-Wah Lam, Tsuen-Wan Ngan, and Ker-Keung To. On the speed requirement for optimal deadline scheduling in overloaded systems. In Proc. 15th International Parallel and Distributed Processing Symposium*, page 202, 2001, which is hereby incorporated by reference in its entirety. However, in the distributed stream processing context, resource utilization is not a good metric. An intermediate processing element such as the processing element PE A 428 in FIG. 4 can utilize many system resources, perform many processes, and output a large number of SDOs, but this work may never make it to the output stream(s) of the system. A large resource allocation to processing element PE A 428 may lead to a high output rate on stream A 404, but this is not productive if the processing elements PE B 434 and PE B 436 do not have sufficient resources to process stream A 404 into system outputs. If all three processing element are running on the same processing node, re-allocating some of the resources of processing element PE A 428 to processing elements PE B 434 and/or PE B 436 increases system throughput. The resource utilization metric used by traditional processor sharing algorithms does not capture these effects. In the present invention, the meta-scheduler 328 instead uses a weighted throughput metric, which attaches a positive weight to each stream that is a system output. By summing the weighted throughputs at each of these output streams, a metric is formed representing the total productive work done by the system.

Correlated Resource Usage Among Processing Elements

Figure 5:
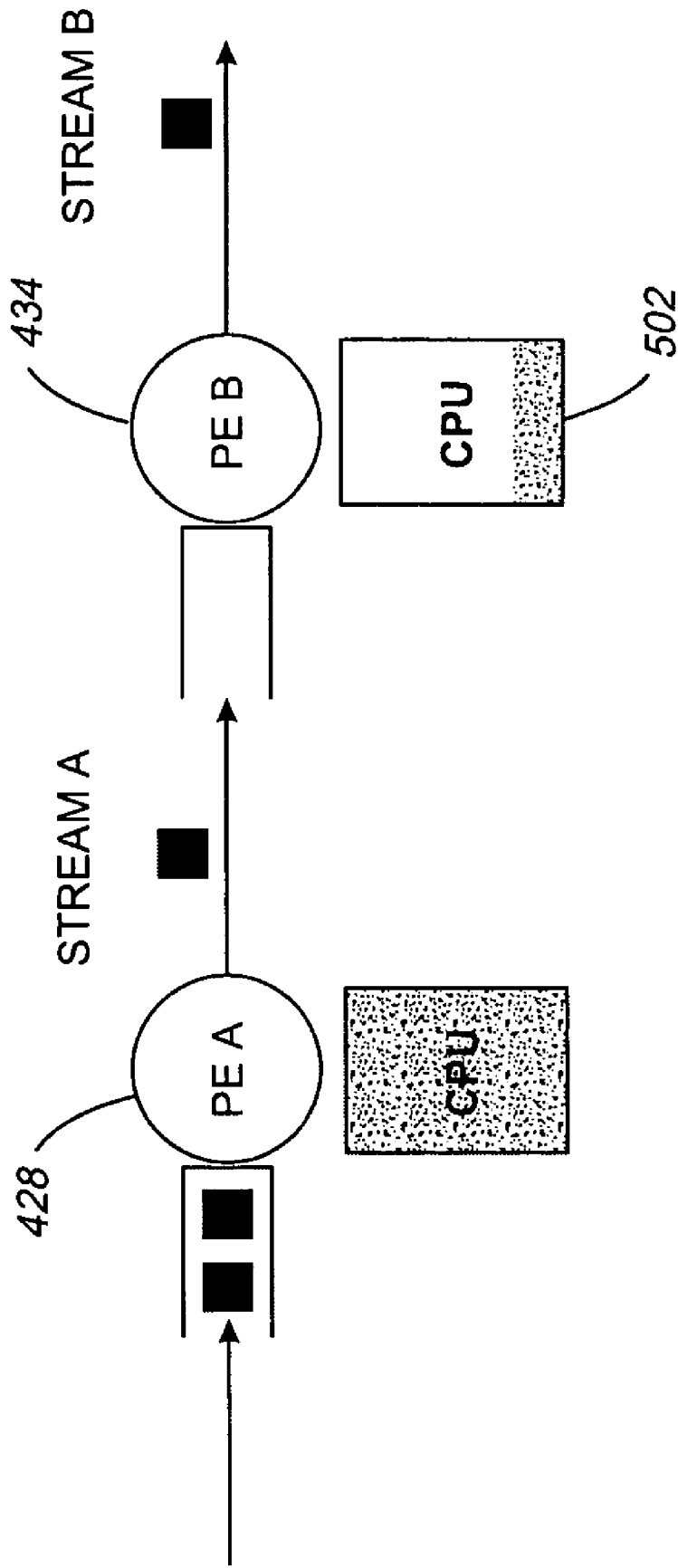
FIG. 5 is an stream processing graph illustrating how a slow processing rate at one processing element affects downstream processing elements.

As can be seen from FIG. 4, processing elements PE A 428 and PE B 434 are constrained by their producer-consumer relationships. Most processing elements in the system receive their input SDOs from other processing elements, and send their output SDOs to yet other processing elements for further processing. Processing elements cannot process SDOs at a faster (average) rate than the rate at which the upstream PE(s) produce them. FIG. 5 shows an example in which processing element PE A 428 produces SDOs at a slow pace, thus constraining the output rate of processing element PE B 434, even though processing element PE B 434 has enough CPU to process SDOs significantly faster. For example, processing element PE B 434 is under utilizing its CPU allocation as illustrated by the fractionally shaded CPU box 502.

Figure 6:
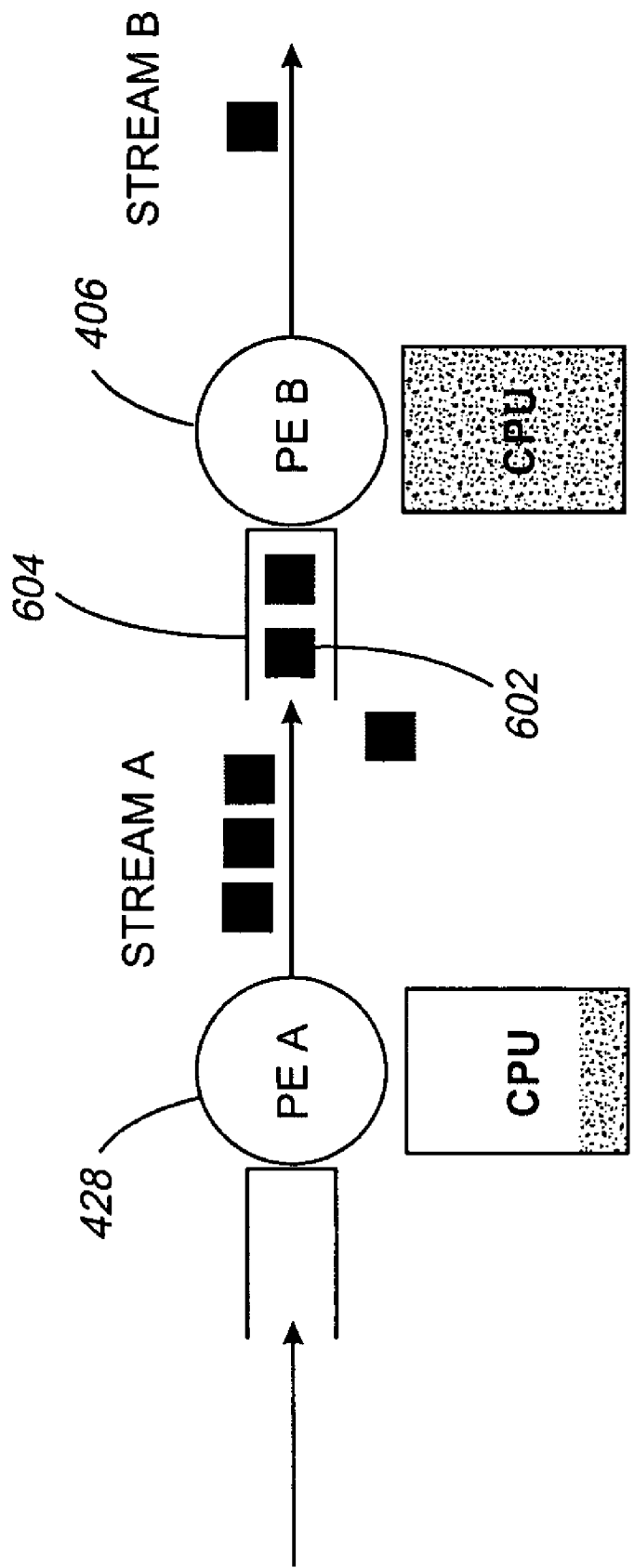
FIG. 6 is a stream processing graph illustrating how processing SDOs at an upstream processing element faster (on average) than a receiving processing element can process them affects a downstream processing element.

Similarly, if a processing element produces SDOs faster (on average) than a receiving processing element can process them, the processing elements will queue up in buffers until the buffers overflow, as shown in FIG. 6. FIG. 6 shows SDOs 602 queued up at the input 602 of processing element PE B 434. When the queue is full, processing element PE A 428 must either slow down its processing rate, or allow SDOs that do not fit into the queue 604 of processing element PE B 434 to be dropped. These constraints implicitly create a correlation between the resource usage of up-stream and down-stream processing elements in a processing graph.

Figure 7:
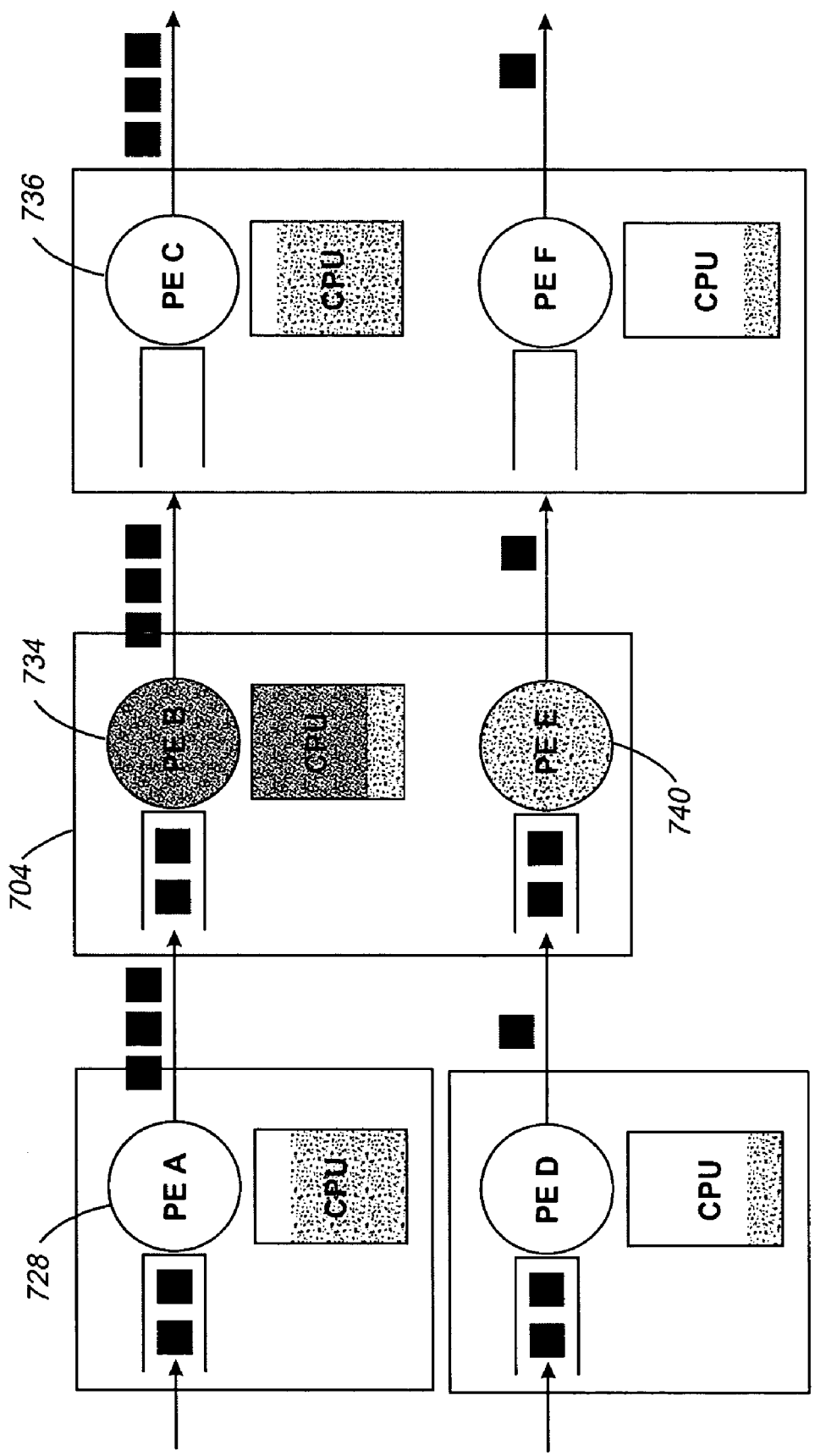
FIG. 7 is a processing graph illustrating the how a resource allocation to a single processing element propagates through connected components in the graph.

In addition to the correlation among up-stream and down-stream processing elements (i.e., processing elements in a single connected component), resource usage amongst processing elements in separate connected components is correlated if the connected components have one or more processing nodes in common. In FIG. 7, processing element PE B 734 and processing element PE E 740 are co-located on a single processing node 704, but are in separate connected components. If processing element PE B 734 is assigned inadequate CPU resources, and becomes a bottleneck on the top connected component (processing element PE A 728 to processing element PE B 734 to processing element PE C 736), the throughput of the top processing element graph is slowed. If the CPU allocation to processing element PE B 734 is increased at the expense of processing element PE E 740, the throughput of the top processing graph may increase, but processing element PE E 740 may become a bottleneck. This reduces the throughput of the bottom processing element graph. Thus, the effects of a resource allocation to a single processing element can propagate not just through that processing element's connected component, but also other connected components.

Another advantage of the present invention is that it takes the various dependencies described above into account. The invention performs an optimization based on the long-term average of the per-SDO resource requirements of each processing element and the flow constraints implied by their producer-consumer relationships. The use of long-term averages simplifies this stage of the optimization, allowing a solver using a fluid-flow approach. Coordination is required to efficiently correlate the processing elements. This becomes a global optimization, rather than just a local scheduling decision. Coordination among all of the processing elements in a processing graph is provided in a distributed manner. The optimization process is described in more detail below.

Unequal Stream Consumption Rates

Figure 8:
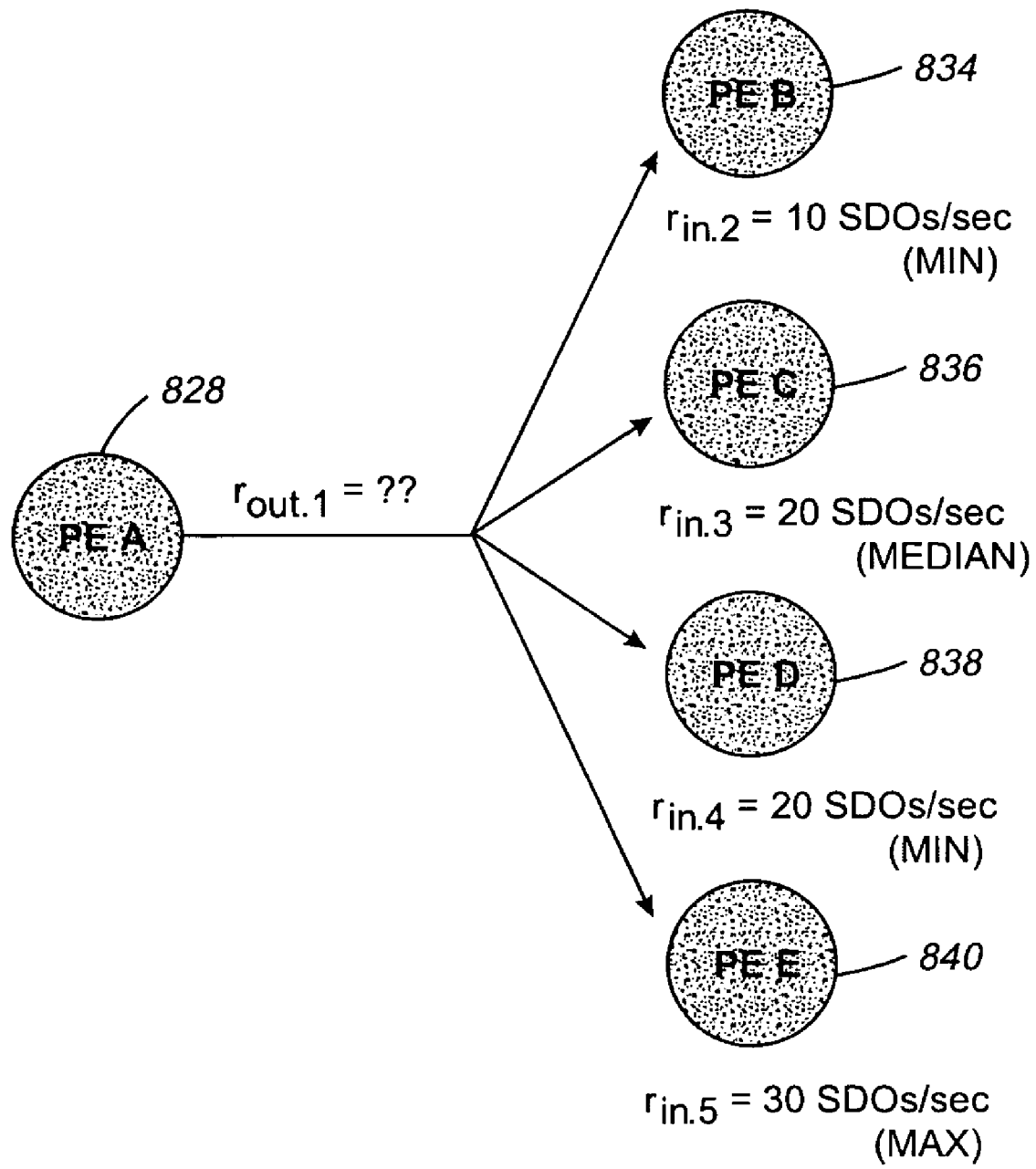
FIG. 8 is a processing graph illustrating how processing elements can receive the same stream but process the stream at different rates.

As discussed above, a processing element 342, 344 342, 344 connected to a single downstream processing element must either constrain its output rate to the input rate of the downstream processing element or experience loss of SDOs when the downstream input buffer overflows. Synchronizing the output rate of a processing element to the input rate of its downstream processing element can help overcome losing SDOs when the above situation arises. However, such a strategy is not necessarily the best when a processing element's output stream is read by multiple downstream processing elements. FIG. 8 shows four processing elements (PE B 834, PE C 836, PE D 838, PE E 840) that read the same stream outputted by processing element PE A 828. Although the same stream is read by the processing elements PE B 834, PE C 836, PE D 802, PE E 804, they read the stream at different rates in the range 10-30 SDOs/sec (10, 20, 20, and 30 SDOs/sec). For this example, assume the time-averaged CPU allocation of processing element PE A 828 is sufficient to produce SDOs at a maximum rate of 30 SDOs/sec (producing SDOs at a rate greater than this is obviously wasteful). However, using the traditional reliable delivery approach (e.g., TCP flow control) processing element PE A 428 produces SDOs at 10 SDOs/sec, which is the rate supported by the slowest processing element (processing element PE B 834). This type of transmission policy is referred to as a min-flow policy.

In a distributed stream processing system this type of transmission policy is not desirable. This is because a min-flow policy slows the entire cluster of connected processing elements to the rate of the slowest member. A large scale stream processing environment where the workload is characterized by data fusion (e.g., aggregation, correlation etc., as opposed to linear workflows) can have many inter-connected processing elements. Operating all of them at the rate of the slowest member leads to under-utilization of resources, and results in data loss at the input to the system. Therefore, in one embodiment, the meta-scheduler 328 defines a transmission policy (i.e. max-flow policy) allowing a processing element to forward at least one packet if at least one of its downstream processing elements has a vacancy in its input buffer. The processing element idles only if there is not a vacancy in any of its downstream processing element. Because the CPU allocation of the processing elements is determined through the maximization of the weighted throughput, the max-flow policy defined by the meta-scheduler 328 and DRC 340 also mandates that each processing element 342, 344 process packets at its CPU allocation.

Accordingly, the DRC 340, enforces the max-flow transmission policy defined by the meta-scheduler 328 by setting the output rate of a particular processing element to the input rate of its fastest downstream processing element. Setting it larger than this wastes resources, and is thus sub-optimal. Setting it lower reduces the throughput of the fastest downstream processing element and unnecessarily reduces the weighted throughput of the system. Therefore, the meta-scheduler 328 and DRC 340 implement a max-flow transmission policy that mandates that each processing element 342, 344 operate at its time-averaged CPU allocation, and forward packets to all its downstream processing elements if there is a vacancy in the input buffer of its fastest downstream processing element. The max-flow policy is described in greater detail below.

As discussed above, the scheduling system 346, in one embodiment, utilizes a two-tiered approach for adaptive distributed resource control. The first tier involves the meta-scheduler 328 assigning resource allocation targets to maximize the weighted throughput of the system. In one embodiment, the scheduling system 346 assumes a fluid-flow model of processing. The second tier involves the CPU scheduler 334, 336, DRC 340 adjusting the instantaneous resource allocations to stabilize the distributed stream processing system 200 the face of an inherently quantized and bursty workload. The first tier also involves the meta-scheduler 328 globally optimizing the weighted information gain of the stream processing system 200. The meta-scheduler 328 communicates resource allocation targets based on the global optimization to the CPU scheduler 334, 336, CPU scheduler 334, 336 distributed resource controller 340 The CPU scheduler 334, 336 distributed resource controller 340, during the second tier, accepts these resource allocation targets. The processing element monitor 338 can either reside alone or within the CPU scheduler 334, 336 distributed resource controller 340, monitors the processing rate, input rate and quantity of buffered data for each processing element. The processing element monitor 338 proactively informs the CPU scheduler 334, 336, processing element monitor 338 of the downstream processing elements of the desired input rate. The processing element monitor 338, in one embodiment, communicates CPU utilization, desired input rates, and buffer occupancy to the distributed resource controller 340. The distributed resource controller 340 uses information from the processing element monitor 338 and the target allocations from the meta-scheduler 328 to determine the instantaneous CPU allocation and communicates this allocation to the CPU scheduler 334, 336.

One advantage of the present invention is that the meta-scheduler 328 updates time-average resource allocations on the order of minutes and can take into account arbitrarily complex policy constraints. Another advantage is that the distributed resource controller and CPU scheduler 334, 336, which must deal with sub-second timescales involved in burstiness, is embedded in each processing node of the system, and uses only local information and desired rate information from directly downstream processing elements.

Global Optimization and Max-Flow

The following is a brief description of the different notations that will be used when describing the global optimization process that yields a max-flow policy and process of dynamically stabilizing the stream processing system 200. In one embodiment, the distributed stream processing system 200 includes S streams (inputs) that are indexed from $s_0$ to $s_{s-1}$. The system comprises P processing elements, denoted $p_0, p_1, \ldots, p_{p-1}$ residing on N nodes, denoted $n_0, n_1, \ldots, n_{n-1}$. The set of all processing elements and all nodes are denoted as P and N, respectively. The set of processing elements residing on a node is denoted as $N_j$, where the subscript $j$ denotes the node index.

The interconnection of the processing elements is represented by a directed acyclic graph ("DAG") as shown in FIG. 4. The set of processing elements that feed data to the processing element j U ($p_j$), and the set of processing elements that processing elements that processing element j feeds data to as D($p_j$). Thus, U($p_j$) denotes the "upstream" processing elements of $p_j$, while D($p_j$) denotes the "downstream" processing elements of $p_j$. Since the processing elements at the egress of the system do not have any downstream processing elements, D($p_j$)=null for $p_j$ at the egress. In addition, the processing elements at the ingress of the system derive their input from a data stream, thus, U ($p_j$)=$s_k$ if processing element $p_j$ derives its data from stream $s_k$.

Time is discretized by sampling in intervals of $\Delta t$ and all quantities are measured at the sampled times. The input and output rates of the processing element j are respectively denoted $r_{inj}$ and $r_{outj}$. Therefore, the input and output bytes of data for processing element j can be respectfully denoted $r_{inj}(n)$ and $r_{outj}(n)$ in the time interval [$n\Delta t$, (n+1) $\Delta t$]. The CPU allocation of processing element $p_j$ in the interval in the interval [$n\Delta t$, (n+1) $\Delta t$] is denoted as $c_j(n)\Delta t$. The CPU allocations are represented in normalized form, thus $$\sum_{j \in N_i} c_j(n) \leq 1 \forall n \geq 0. \quad \text{(Eq 1)}$$

The time averaged values of $r_{inj}(n)$, $r_{outj}(n)$, and $c_j(n)$ are defined as, $\bar{r}_{in,j}$, $\bar{r}_{out,j}$, and $\bar{c}_j$. Thus, $$\bar{r}_{in,j} = \lim_{n \to \infty} \frac{1}{N} \sum_{n=0}^{N} r_{in,j}(n), \bar{r}_{out,j} \quad \text{(Eq 2)}$$

-continued $$= \lim_{n \to \infty} \frac{1}{N} \sum_{n=0}^{N} r_{out,j}(n), \overline{c}_j$$

$$= \lim_{n \to \infty} \frac{1}{N} \sum_{n=0}^{N} r_{in,j}(n), \overline{c}_j(n)$$

Global Optimization

The global optimization determines the time-averaged allocations $\bar{r}_{in,j}$, $\bar{r}_{out,j}$, and $\bar{c}_j$ for each processing element such that the weighted throughput is maximized. During operation a control algorithm is used to alter $r_{in,j}(n)$, $r_{out,j}(n)$, and $c_j(n)$ to achieve two objectives: (1) stability of the system and (2) ensure that $r_{in,j}(n)$, $r_{out,j}(n)$, and $c_j(n)$ are varied such that over a reasonably long epoch, Equation 2 is met. The long-term CPU target is denoted $\bar{c}_j$ and $c_j(n)$ defines the CPU allocation at time $n\Delta t$ The global optimization maximizes an aggregate utility function. Processing element $p_j$ is associated with a utility $U_j(\bar{c}_j)$, if its time-averaged output rate is set to $\bar{c}_j$. The function $U_j(\bar{c}_j)$ is strictly increasing, concave, differentiable. The utility function of the various processing elements is parameterized as $U_j(\bar{c}_j) = w_j U(\bar{c}_j)$, where $w_j$ is the "weight" of a processing element (a larger weight implies higher utility), and the function $U(x)$ is identical for all the processing elements. For example, the variable $U(x)$ can be set, in one embodiment, to $U(x)=1-e^{-x}$; $U(x)=\log(x+1)$; $U(x)=x$. The weights $\{w_j\}$ measure the relative importance of the processing elements. The cumulative utility of the system (denoted $U_s$) is then given as the sum of the utilities of the processing elements $$U_s(\bar{r}_{out,0}, \bar{r}_{out,1}, \ldots, \bar{r}_{out,P-1}) = \sum_{j \in P} w_j U(\bar{r}_{out,j}) \quad \text{(Eq 3)}$$

Equation 3 can be maximized under the following set of constraints:

$$\sum_{j \in N_i} \bar{c}_j \leq 1 \text{ for } 0 \leq i \leq N-1 \quad \text{(Eq 4)}$$

$$\bar{r}_{in,j} \leq \bar{r}_{out,i} \text{ for } i \in U(p_j), 0 \leq j \leq P-1 \quad \text{(Eq 5)}$$

$$\bar{r}_{in,j} = h_j(\bar{c}_j), \quad \text{(Eq 6)}$$

where $h_j(\bar{c}_j)$ denotes the average input rate when the CPU allocation for processing element j is $\bar{c}_j^{-1}$. The function $h_j(\bar{c}_j)$ is modeled as $a\bar{c}_j - b$ where a and b are constants that are determined empirically. The constant b represents the overhead involved in setting up the data structures of the processing elements, the overhead in the function, etc. The constant a represents the number of bytes of input data that can be processed by the processing per processing cycle. Equation 4 ensures that the CPU allocations of all the processing elements on a node sum to less than one. Equation 5 ensures that the output rate of a processing element is not less than the input rate of its downstream processing element (the inequality in Equation 5, as opposed to an equality, stems from the fact that a max-flow policy is enforced). Lastly, Equation 6 maps the CPU allocations to the time-averaged input rates $\bar{r}_{in,j}$.

In one embodiment, Lagrange multipliers are used to maximize Equation 3. As such any concave optimization algorithm can be used. The concavity of the cumulative utility ensures that there exists a unique set of CPU allocations $\bar{c}_j^{-1}$ that maximize Equation 3.

Dynamic Stabilization

The meta-scheduler 328, as described above, allocates resources to processing elements so that information gain can be optimized throughout the stream processing system 200. This is accomplished, in one embodiment, by optimizing the allocation according to information gain at the processing elements 342, 344. Additionally, each processing element 342, 344 processes an arriving data packet if there is space available in its output queue. Packets are sent from this output queue when there is room in the input queue of at least one of the processing elements 342, 344 it feeds. For example, the processing element monitor 338 monitors the input and output queues to determine if a packet can be processed or transmitted downstream. Processing elements 342, 344 whose input queues are full will not receive the packet. Additionally, each processing element 342, 344 in the system 200 operates at the maximum of the sustainable rates of its downstream processing elements 342, 344 and its CPU allocation. However, in many instances data packets are not received in a fluid fashion.

Most processing elements 342, 344 tend to do work not in a fluid (infinitely divisible and smooth) stream of processing operations, but in relatively large chunks. For example, video processing elements may require an entire frame, or an entire set of independently-compressed frames ("Group Of Pictures") to do a processing step. More importantly, many processing elements 342, 344 require different amounts of resources (i.e. memory, CPU time) to process each group of SDOs. Both of these factors contribute to unevenness, e.g. burstiness, in the processing rates and resource utilizations of a processing element 342, 344. Even when processing elements 342, 344 themselves are well-behaved computationally, they may share a processing node with other more bursty processing elements 342, 344, as well as various system tasks with bursty resource usage.

One solution to the burstiness problem is to add buffers. However, designing for very high data rates and scalability in the number of process elements per processing node make buffering increasingly expensive, as system memory becomes a severe constraint. Additionally, increasing buffer sizes also increases the average end-to-end latency of the system. One advantage of the present invention is that the available buffer space is efficiently used to balance the effects of data loss, burstiness, and latency.

Figure 9:
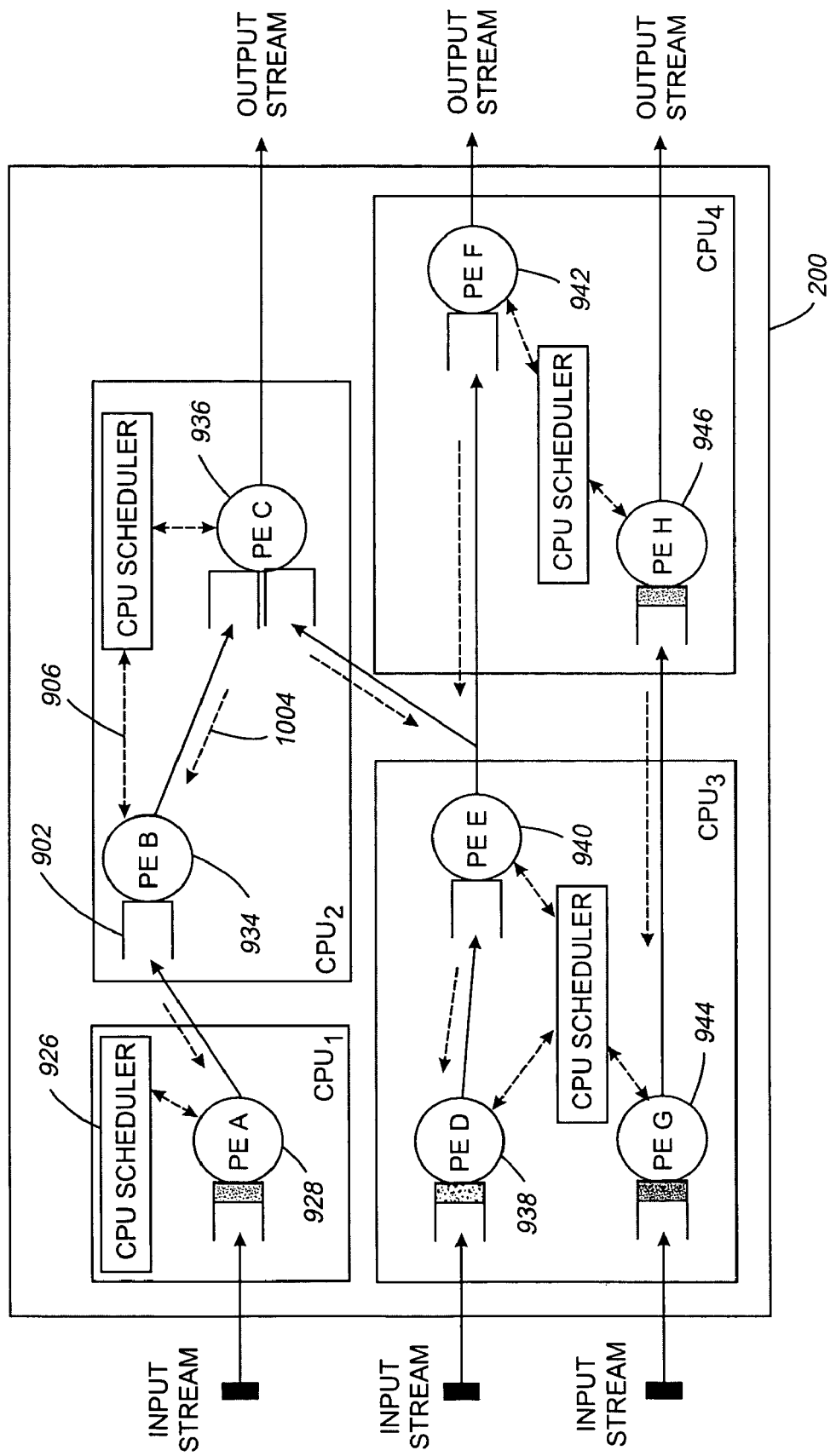
FIG. 9 is a stream processing graph illustrating communication between processing elements and a CPU scheduler.

For example, FIG. 9 shows a processing graph 900 for dynamic stabilization. The processing graph 900 includes processing elements PE A 928, PE B 934, PE C 936, PE D 938, PE E 940, PE F 942, PE G 944, PE H 946 connected via buffering interfaces such as buffering interface B 902. The dotted lines 904 depict the flow of control information between processing elements along a path. The double-arrowed dashed lines 906 depict the communication between the processing elements residing on a processing node and the CPU scheduler 334, 336. The solid lines 908 depict the flow of data in the network.

The scheduling system 346 performs dynamic, distributed joint CPU scheduling and flow-control for maintaining the stability of the stream processing system 200. The DRC 340 stabilizes the input, output, and processing rates of all the processing elements within its respective processing node. The DRC 340 adjusts these rates gradually over time as necessary to keep input buffers near target levels. Ensuring stable buffer occupancy levels has several benefits. When the system 200 keeps enough data in incoming processing element buffers 902, many processing elements can take advantage of "batching" by processing several SDOs in quick succession (rather than having each processing element process a single SDO, then executing the next processing element). By batching the processing of several SDOs by the same processing element, the system can avoid context-switching overhead, decrease memory cache misses, and transfer data in larger chunks (e.g. by buffering multiple output SDOs before sending them to the network). Also, when the system keeps buffers from becoming too large, end-to-end processing latency is decreased, and the present invention avoids filling a buffer completely (which may result in upstream processing elements being asked to pause their processing).

Flow Control

The flow control performed by the scheduling system 346 is described next. As can be seen in FIG. 9, the dotted lines represent control flow communication between processing elements. For example, input and output rates of one processing element can be communicated to another processing element so that buffer overflow can be avoided. Control flow regulates the flow of data between the processing elements through local communication of control information between the processing elements, as shown by the dotted lines in FIG. 9. The flow control process performed by the scheduling system 346, in one embodiment, regulates the output rate of a processing element so that it does not exceed the allowable input rate of its downstream processing element.

As discussed above, a myopic optimization strategy, where each processing element processes data agnostic to the state of its co-located and downstream processing elements leads to instability of a distributed stream processing system. In one embodiment, a joint flow and CPU control algorithm is used to meet the stability objectives discussed above in section entitled "Dynamic Stabilization". It should be noted that the following discussion regarding the flow and CPU control algorithms are exemplary and not limiting with respect to the present invention. In one embodiment, for processing element j at time $n\Delta t$ the control algorithm jointly determines $b_{in,j}(n)$, $r_{out,j}(n)$, and $c_j(n)$ in a distributed manner, taking into account the input buffer occupancy of the processing element and the feedback from its downstream and co-located processing elements.

The goal of the allocation, in one embodiment, is to maintain stability of the distributed stream processing system and avoid loss of partially processed data due to buffer overflow. The processing rate of processing element $p_j$ in the interval $[n\Delta t, (n+1)\Delta t)$ is denoted as $\rho_j(n)$. Thus, $\rho_j(n)=h_j(c_j(n))$, where $h_j(c_j(n))$ is the mapping from CPU allocation to the processing rate for processing element $p_j$. The occupancy of the input buffer of processing element j at $n\Delta t$ is denoted as $b_j(n)$. The size of all the buffers in the system is fixed at B. Thus, the evolution of $b_j(n)$ follows the equation $$b_j(n+1) = [b_j(n) + \tilde{r}_{in,j}(n) - p_j(n)]_0^B \quad \text{(Eq 7)}$$

where $[x]_a^b=\max(a,\min(x,b))$. The output rate of processing element j in the interval $[n\Delta t,(n+1)\Delta t)$, $r_{out,j}(n)$ depends on its CPU allocation in time interval $[n\Delta t,(n+1)\Delta t),c_j(n)$. In one embodiment, this mapping is denoted by a function $g_j(c_j(n))$, i.e., $r_{out,j}(n)=g_j(c_j(n))$. For a processing element in isolation, the input rate $r_{in,j}(n)$ and the CPU allocation $c_j(n)$ of the processing element can be chosen freely. The processing rate $\rho_j(n)$, buffer occupancy $b_j(n+1)$ and output rate $r_{out,j}(n)$ are then dependent variables, uniquely determined through $r_{in,j}$ (n) and $c_j(n)$. For processing elements connected in series, the input rate of a processing element is equal to the output rate of its upstream processing element. Thus, $r_{in,j}(n)$ is also a dependent variable, albeit on a quantity exogenous to PE j.

During the flow control process, the DRC 340 determines, for each processing element, a maximum admissible input rate $r_{max,j}(n)$ and CPU allocation $c_j(n)$ for the time interval $[n\Delta t, (n+1)\Delta t)$ based on its buffer occupancy $b_j(n)$, and the maximum admissible input rate of its downstream processing element. This rate is communicated to the upstream processing element of processing element j, $PEU(p_j)$. In turn, PEU ($p_j$) performs the same calculation. The determination of $c_j(n)$ for processing element j is discussed in greater detail below in the section entitled "CPU Control". With respect to the flow control process, $c_j(n)$ is determined such that the output rate of processing element j is less than or equal to the maximum admissible input rate of its downstream processing element, i.e., $$r_{out,j}(n) \leq r_{max,D(j)}(n).$$

The computation of $r_{max,j}(n)$ is outlined such that the operation of the system is stable. In one embodiment, a control is applied to determine the maximum admissible input $r_{max,j}(n)$ at time step n such that the closed-loop dynamics of the processing element follow the equation $$r_{\max,j}(n) = \left[\rho_j(n) - \sum_{k=0}^{K} \lambda_k\{b_j(n-k) - b_0\} - \sum_{l=1}^{L} \mu_l\{r_{\max,j}(n-l) - \rho_j(n-l)\}\right]^+ \quad \text{(Eq 8)}$$

where $[x]^+=\max(x,0)$. The parameter $b_0$ denotes the desired buffer occupancy that the controller tries to maintain. In general, $b_0$ is chosen to satisfy two objectives: (a) minimizing the queuing delay and avoiding buffer overflow, and (b) ensuring high utilization of the processing element, or alternatively, minimizing the chance of a buffer underflow. Therefore, in one embodiment, the size $b_0$ is chosen so that these objectives are met. For a given $b_0$, if constants $b_0$ $\{\lambda_k\}$ are large (relative to $\{\mu_l\}$), the processing element tries to make $b_j(n)$ equal to $b_0$. On the other hand, if $\{\mu_l\}$ is large relative to $\{\lambda_k\}$, the processing element attempts to equalize the input and the processing rates. In one embodiment, $\{\lambda_k\}$ and $\{\lambda_l\}$ are determined such that an appropriate trade-off is struck between the two extremes.

CPU Control

In one embodiment, the scheduling system 346 achieves dynamic stabilization through a CPU allocation process and flow control process. In one embodiment these two processes are performed in tandem to ensure stability of the system 200. As can be seen in FIG. 9, the dashed lines represent the communication between a processing element and its respective CPU scheduler for a CPU control process. Each CPU scheduler 926 runs the CPU scheduling process on its respective node. The CPU scheduling process partitions the computational resources available on each node among the processing elements running on it based on the input buffer occupancies of these processing elements. The computational resources are also partitioned based on the long-term averaged CPU goals of the processing elements and feedback from downstream processing elements.

The feedback from downstream processing elements provides an upper bound for the CPU allocation to a processing element. At time $n\Delta t$, processing element j receives an update of $r_{max,i}(n)$ from all its downstream processing elements PEs $i \in D(p_j)$. Processing element j determines an upper bound on its output rate using this information as $$r_{o,j}(n) \leq \max\{r_{max,i}(n) : i \in D(p_j)\} \quad \text{(Eq 21)}$$

This bounds its CPU allocation $c_j(n) \leq g_j^{-1}(r_{o,j}(n))$, and consequently, its processing rate $\rho_j$. Note that Equation 21 embodies the max-flow paradigm discussed in the section entitled "Global Optimization And Max-Flow". The allocation of resources is achieved through the use of a token-bucket mechanism, where the processing elements running on a particular node earns tokens at a fixed rate. Each processing element subsequently expends these tokens on CPU resources, depending on its processing requirements.

Token Bucket

The long term averaged CPU allocation of a processing element j is denoted as $c_j(n)$. The downstream processing element to processing element j is referred to as Ds(j). Similarly, the upstream processing element to processing element j is denoted as us(j). In time $\Delta t$, the processing nodes accumulates as many tokens. These are divided among the various processing elements running on the processing node in proportion to their long-term CPU $c_j(n)$. In the event that a processing element does not use tokens for a period of time, it accumulates tokens at a rate proportional to $c_j(n)$. Infinite build-up of tokens is avoided by limiting the number of tokens that can be accumulated by a processing element to a maximum value. The model through which the processing elements use these tokens is as follows. The CPU of each node is partitioned into two virtual CPUs, with normalized computation cycles $\rho$ and $1-\rho$. In time $\Delta t$, the virtual CPUs have $\rho \Delta t$ and $(1-\rho) \Delta t$ computation cycles to offer, respectively.

Consider the partition with normalized computational cycles $(1-\rho) \Delta t$ first. The $(1-\rho) \Delta t$ computation cycles are divided among a subset of processing elements running on the node (in ratio of the $c_j$s). A processing element running on the node is eligible for a fraction of $(1-\rho) \Delta t$ if a.) it has non-zero input buffer occupancy, and therefore requires computation cycles to process data and b.) the processing element possesses an adequate number of tokens to exchange for computation cycles.

The fraction $\rho \Delta t$ of CPU is allocated to the processing elements such that rapid build-up of data in the input buffer of the processing elements is avoided. This is accomplished, in one embodiment as follows. Processing element j is eligible for a fraction of $\rho \Delta t$ if 1.) its input buffer occupancy b(t) is greater than a pre-defined threshold $b_0$ and 2.) It has adequate tokens to expend on the computational resource. The eligibility of processing element j for the computational resources is denoted with the indicator function $1_j(t)$. The fraction $\rho \Delta t$ is divided among the eligible processing elements in the ratio of their normalized companded buffer occupancy. A concave increasing function $f: R \rightarrow R$ is used as the compander. Thus, a processing element with large normalized buffer occupancy receives a large fraction of $\rho \Delta t$ and vice-versa. Note that a processing element with buffer occupancy lesser than $b_0$ does not receive any part of the CPU from the fraction $\rho$.

In one embodiment, the processing elements are allowed to expend their token for CPU cycles proportional to their input buffer occupancies, such that $c_j(n)$ does not exceed the bound of Equation 21. In this manner, the long-term CPU allocation of a processing element on a node is maintained at its CPU target, since it accumulates tokens at a rate equal to its CPU goal. The instantaneous CPU allocation of the processing elements is, however, dependent on its congestion level (i.e., buffer occupancy) and the feedback from its downstream processing elements. The CPU control algorithm thus aims to mitigate congestion and loss of partially processed data while maintaining the long-term CPU targets of the processing elements.

Exemplary Process for Optimizing Information Gain

Figure 10:
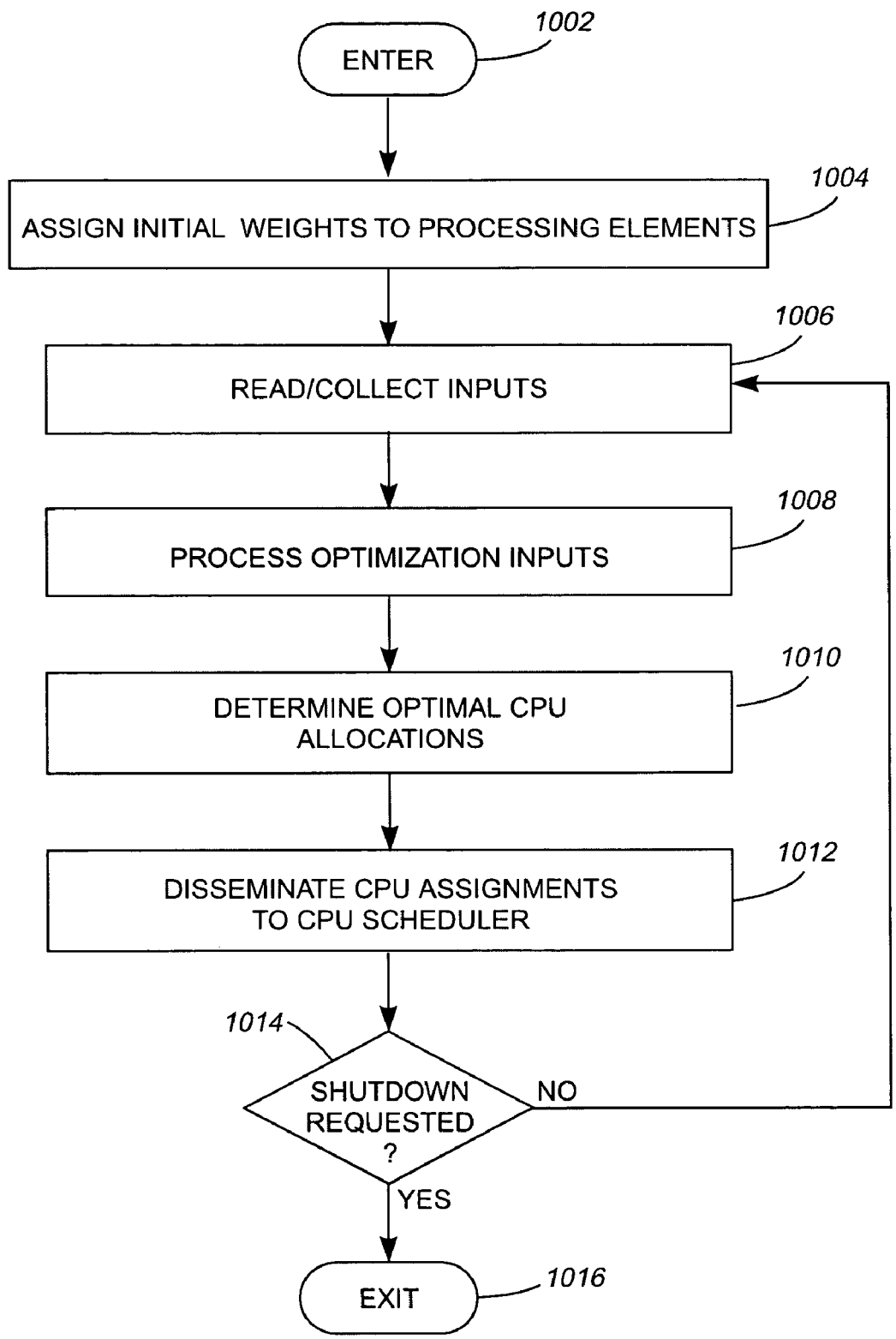
FIG. 10 is an operational flow diagram illustrating an exemplary process of globally optimizing weighted information gain, according to an embodiment of the present invention.

FIG. 10 illustrates an exemplary process of allocating CPU resources to optimize information gain throughout the distributed stream processing system 200. The operational flow diagram of FIG. 10 begins at step 1002 and flows directly to step 1004. The meta-scheduler 328, at step 1004, assigns a weight to each processing element that produces information gain. For example, the information gain analyzer 318 analyzes the information gain at each node and determines a weight for each processing element. The weight values of each processing element and other values used for optimization such as processor specifications, at step 1006, are passed to the optimizer 320 component of the meta-scheduler 328. The optimizer 330, at step 1008, processes these inputs and determines, at step 1010, an optimization scheme for the processing node. For example, a global optimizing algorithm is run and outputs CPU allocations for the various processing elements that optimize information gain. The optimal CPU allocations, at step 1012, are transmitted to the DRC 340. The control flow then tests whether the system is being shutdown in step 1014. If the system is being shutdown, the meta-scheduler 328 exits in step 1016. If the system is not being shutdown, the meta-scheduler returns to step 1006 to repeat the optimization with updated inputs.

Exemplary Process for Max-Flow Policy

Figure 11:
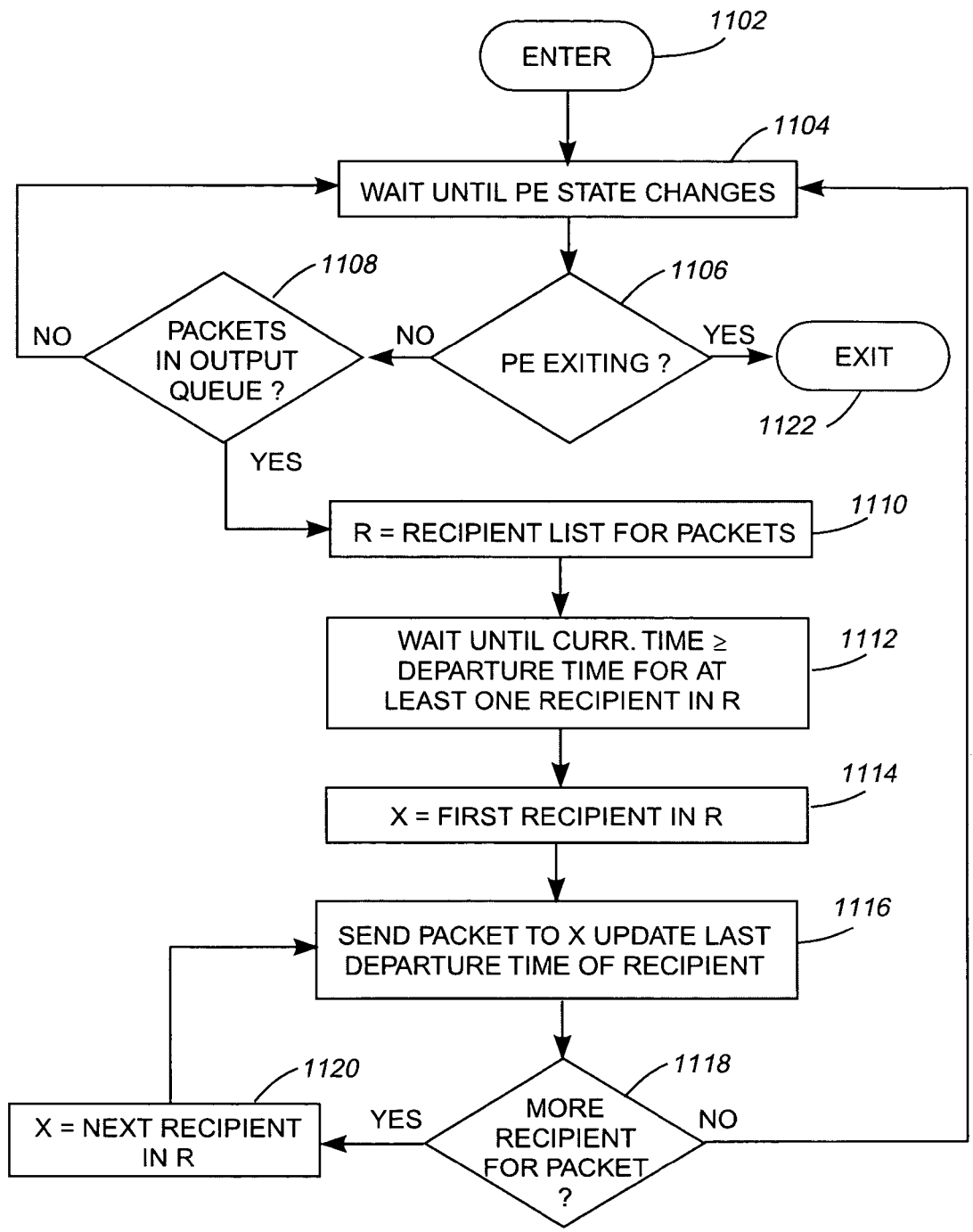
FIG. 11 is an operational flow diagram illustrating an exemplary process of transmitting data packets according to a max-flow transmission policy, according to an embodiment of the present invention.

FIG. 11 illustrates an exemplary process of transmitting a data packet according to the max-flow policy. The process illustrated in FIG. 11 is carried out by the DRC 340 for each PE transmitting stream data. The operational flow diagram of FIG. 11 begins at step 1102 and flows directly to step 1104. The DRC 340, at step 1104, waits for a change of state by the PE transmitting packets. A change in state may be a change to indicate new data has been queued for transmission or that the PE is terminating. When a change in state is detected, the DRC 340, at step 1106, tests whether the PE is terminating. If the PE is terminating, the DRC instance for this PE, at step 1122, is also terminated. If the PE is not terminating, the DRC 340, at step 1108, tests whether one or more packet is ready for transmission. If a packet is not available, the DRC returns to step 1104 to wait for the next change of state. If a packet is available for transmission, the DRC 240, at step 1110, identifies the list of downstream recipient PEs (R) for the packet.

The DRC 340, at step 1112, waits until the current time is greater than the departure time for the first recipient of the packet. The departure time for each recipient PE is set according to the desired input rate communicated from the downstream PE's DRC 340. The DRC 340, at step 1114, sets X to the first recipient for the packet and transmits the packet at step 1116. The DRC 340, at step 1118, then checks if there are other recipients for which the current time is greater than or equal to the departure time. If there are more recipients, the DRC 340, at step 1120, sets X to this next recipient and loops back to step 1116. If there are no other recipients for which the current time is greater than the departure time, the DRC 340 loops back to step 1104 to wait for another state change.

As can be seen, the process described in FIGS. 10 and 11 sets the CPU assignment of each processing element, such the each processing element is able to output packets at an average rate which is as close as possible to the input rate of the fastest downstream each processing element. CPU allocations that are less than required to match the output rate of downstream processing elements may occur due to resource limitations. In addition, a flow-control component can be used in conjunction to ensure that CPU cycles are not wasted when processing or bandwidth is bursty. Thus, instantaneously, the present invention enables each processing element in the system to operate at the maximum of the sustainable rates of its down-stream each processing element s and its CPU allocation.

Exemplary Process of CPU Control for Dynamic Stabilization

FIG. 12 illustrates an exemplary process of CPU control that when used in conjunction with the data flow control process described in FIG. 11 allows for dynamic stabilization of the stream processing system 200. The operational flow diagram of FIG. 12 begins at step 1202 and flows directly to step 1204. The DRC 340, at step 1204, receives CPU target values from the meta-scheduler 328. The CPU used by each processing element in a previous epoch, at step 1206, is computed. For the initial epoch, this value is seeded with the target value from the meta-scheduler 328. The token buckets, at step 1208, for each processing element are updated. The DRC 340, at step 1210, allocates $1-\rho$ CPU cycles in a ratio of $\{c_i\}$. The DRC 340, at step 1212, allocates $\rho$ CPU cycles equally among processing elements whose i/p buffer is more than $B_0$. The allocation targets, at step 1214, are transmitted to the CPU scheduler 334, 336. The DRC 340, at step 1216, tests whether a shutdown of the node has been requested and if so, proceeds to step 1222. If a shutdown is not being requested, the DRC waits a predefined interval of time in step 1218 and continues at step 1204.

One advantage of the present invention is that a two-tiered approach for adaptive, distributed resource control is provided. When a new processing element is deployed, this first tier process selects a processing element and the fractional allocations of processing node resources for each processing element. Allocations are determined through a global optimization of the weighted throughput for the processing graph, based on an expected, time-averaged input stream rates, as opposed to utilization or the aggregate throughput of the system. Once the initial placement decisions are made, the second tier decisions are made in a distributed, ongoing manner.

This second tier, the CPU scheduler, jointly optimizes the input and output rates of a processing element and the instantaneous processing rate of a processing element, These rates are adjusted gradually over time as necessary to keep input buffers near target levels, with the express goal of stabilizing the system. The CPU scheduler 334, 336 an adaptive, scalable, distributed optimization technique. Specifically, CPU and flow control for each processing element is performed using only the buffer occupancy of that processing element and feedback from its downstream processing elements and co-located processing elements.

Another advantage of the present invention is that the scheduling system 346 takes the input data flow rate, and the a-priori importance of the input data stream into account while allocating resources to a processing element. Scalability is ensured by the having the CPU scheduler use locally derived information to enforce the allocations. Another advantage is that the present invention provides optimality and stability by first solving for the global solution that does not take the stochastic, time-varying nature of the data flows into account, to determine nominal CPU allocations among the processing elements. During run-time, these nominal allocations are altered to ensure stability based on the local information available to each processing element.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on an upstream processing node for processing data packets, the method comprising:

receiving an allocation for at least one computing resource, wherein receiving an allocation of at least one computer resource further comprises:

assigning a weight to the one or more upstream processing elements based upon information gained from the one or more upstream processing elements during processing of the data packet to form a resulting data packet;

prioritizing allocation of the at least one computing resource based on the weight which has been assigned, wherein prioritizing allocation of the at least one computing resource maximizes the information gained among the one or more upstream processing elements; and allocating the at least one computing resource to at least one or more upstream processing elements based upon an allocation order determined from prioritizing allocation of the at least one computing resource;

receiving at least one data packet at the at least one or more upstream processing elements in an upstream processing node;

determining if at least one output queue of the upstream processing elements includes available space for processing of the data packet;

processing the data packet in response to the output queue including available space to form a resulting data packet;

determining that an input queue of at least one downstream processing element of a plurality of downstream processing elements includes available space for receiving the resulting data packet;

receiving at least one input rate data from the plurality of downstream processing elements communicatively coupled to the output queue of the upstream processing element, wherein at least two downstream processing elements of the plurality of processing elements include different input rates;

determining a fastest input rate from the input data rate received from the plurality of downstream processing elements;

transmitting, in response to the determining, the resulting data packet from the upstream processing element to the downstream processing element, wherein transmitting the resulting data packet further includes:

transmitting data packets to each of the plurality of downstream processing elements communicatively coupled to the output queue of the upstream processing element at an average rate closest to the fastest input rate of the plurality of downstream processing elements which has been determined; and buffering a processed data packet in the output queue of the downstream processing element.

* * * * *